(12) United States Patent
Hanya et al.

(10) Patent No.: US 11,900,975 B2
(45) Date of Patent: Feb. 13, 2024

(54) HEAD DRIVING DEVICE

(71) Applicant: NHK SPRING CO., LTD., Yokohama (JP)

(72) Inventors: Masao Hanya, Yokohama (JP); Ryo Kuwata, Yokohama (JP)

(73) Assignee: NHK SPRING CO., LTD., Tokyo (JP)

( * ) Notice: Subject to any disclaimer, the term of this patent is extended or adjusted under 35 U.S.C. 154(b) by 0 days.

(21) Appl. No.: 17/986,333

(22) Filed: Nov. 14, 2022

(65) Prior Publication Data

US 2023/0154490 A1 May 18, 2023

(30) Foreign Application Priority Data

Nov. 16, 2021 (JP) ................................. 2021-186537

(51) Int. Cl.
*G11B 5/48* (2006.01)

(52) U.S. Cl.
CPC .......... *G11B 5/4873* (2013.01); *G11B 5/4833* (2013.01)

(58) Field of Classification Search
None
See application file for complete search history.

(56) References Cited

U.S. PATENT DOCUMENTS

| | | | | |
|---|---|---|---|---|
| 7,057,857 | B1* | 6/2006 | Niu | G11B 5/4826 |
| 10,783,909 | B1* | 9/2020 | Tiller | G11B 5/4826 |
| 10,971,184 | B1 | 4/2021 | Chew | |
| 10,991,390 | B2 | 4/2021 | Kobayashi | |
| 11,393,498 | B2* | 7/2022 | Kobayashi | G11B 25/063 |
| 2006/0077594 | A1* | 4/2006 | White | G11B 5/5552 |
| 2020/0258544 | A1* | 8/2020 | Kobayashi | G11B 21/027 |
| 2021/0074330 | A1* | 3/2021 | Harper | G11B 5/00817 |

FOREIGN PATENT DOCUMENTS

JP 2020129424 A 8/2020

* cited by examiner

*Primary Examiner* — William J Klimowicz
(74) *Attorney, Agent, or Firm* — Holtz, Holtz & Volek PC

(57) ABSTRACT

A head driving device includes a head supporting portion supporting a head member, a first beam, a second beam, a first piezoelectric unit including a pair of piezoelectric elements, and a second piezoelectric unit including a pair of piezoelectric elements. When voltage is applied to the piezoelectric elements of the first piezoelectric unit, the piezoelectric elements deform, and a distal end of the first beam moves. The piezoelectric elements of the second piezoelectric unit also deform by application of voltage, and moves a distal end of the second beam in a same direction as the distal end of the first beam.

14 Claims, 18 Drawing Sheets

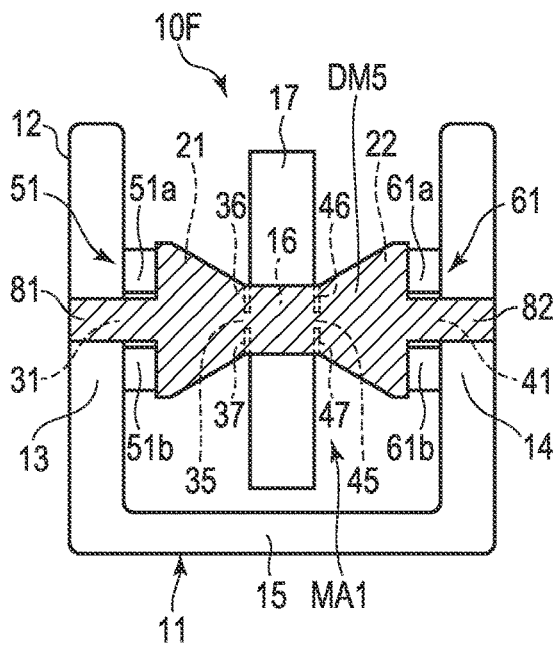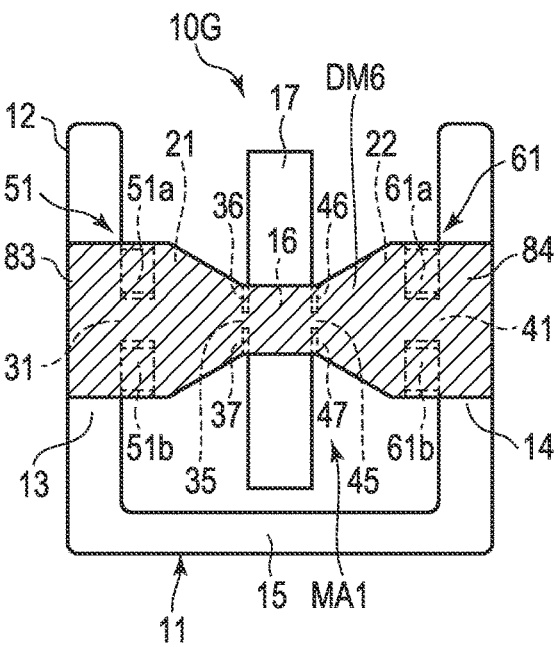
FIG. 13A  FIG. 13B
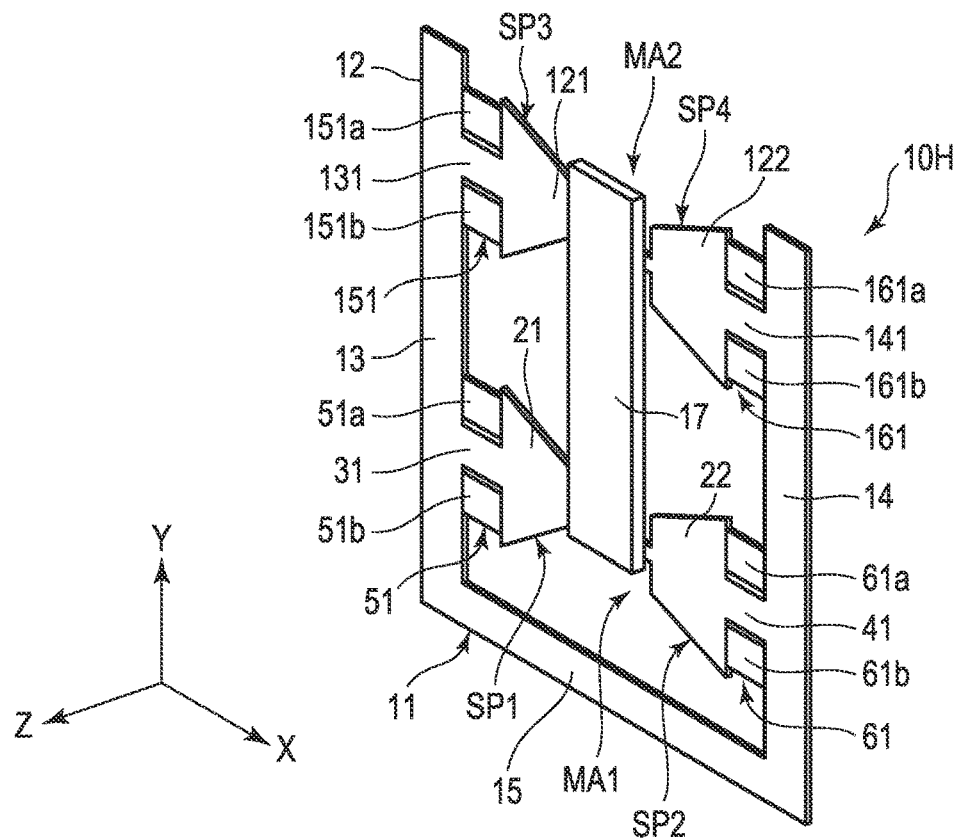
FIG. 14

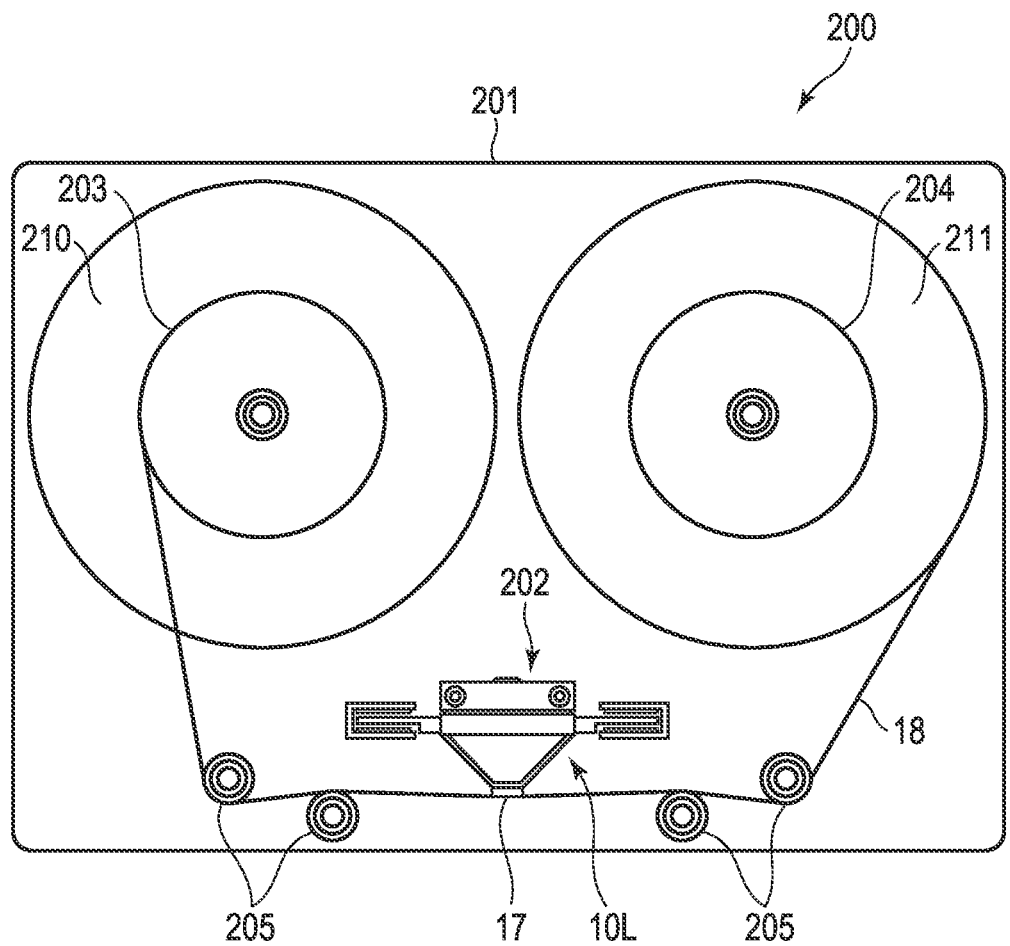
F I G. 18

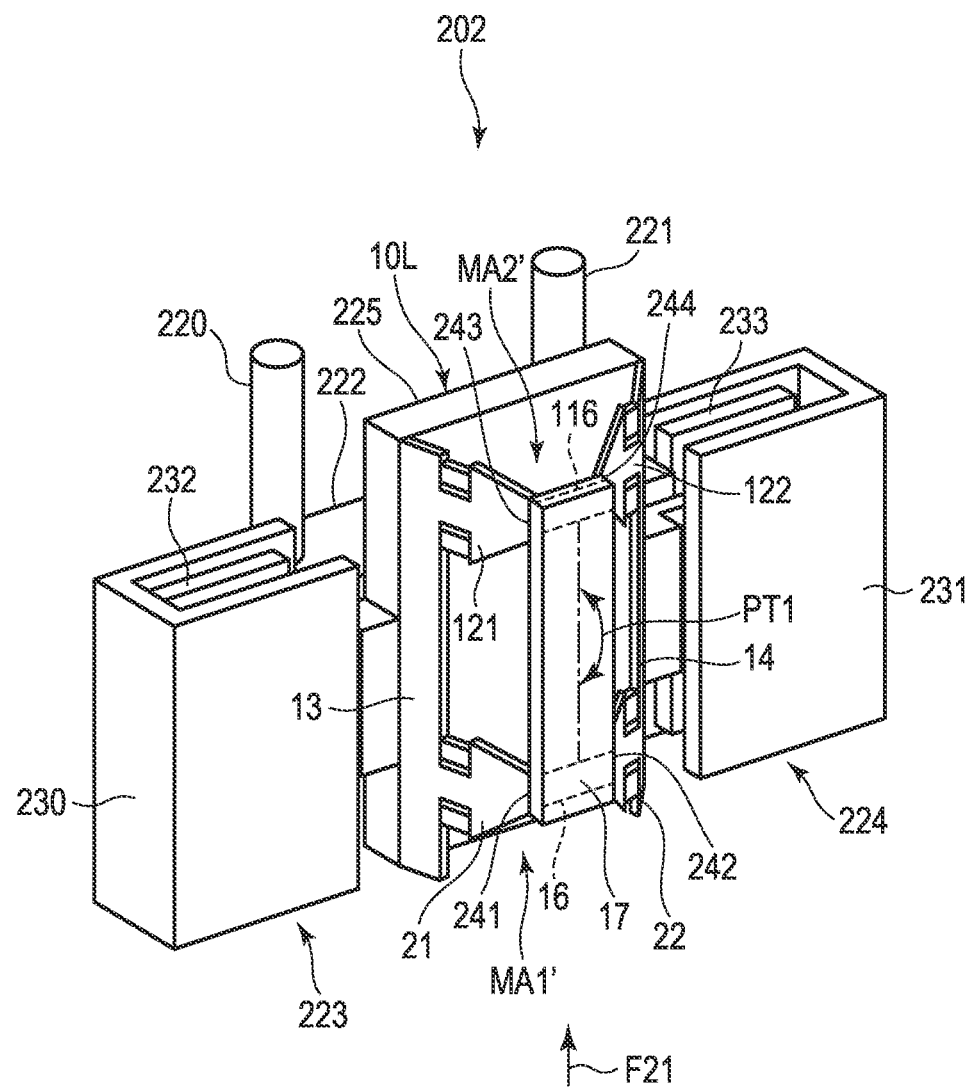
F I G. 19

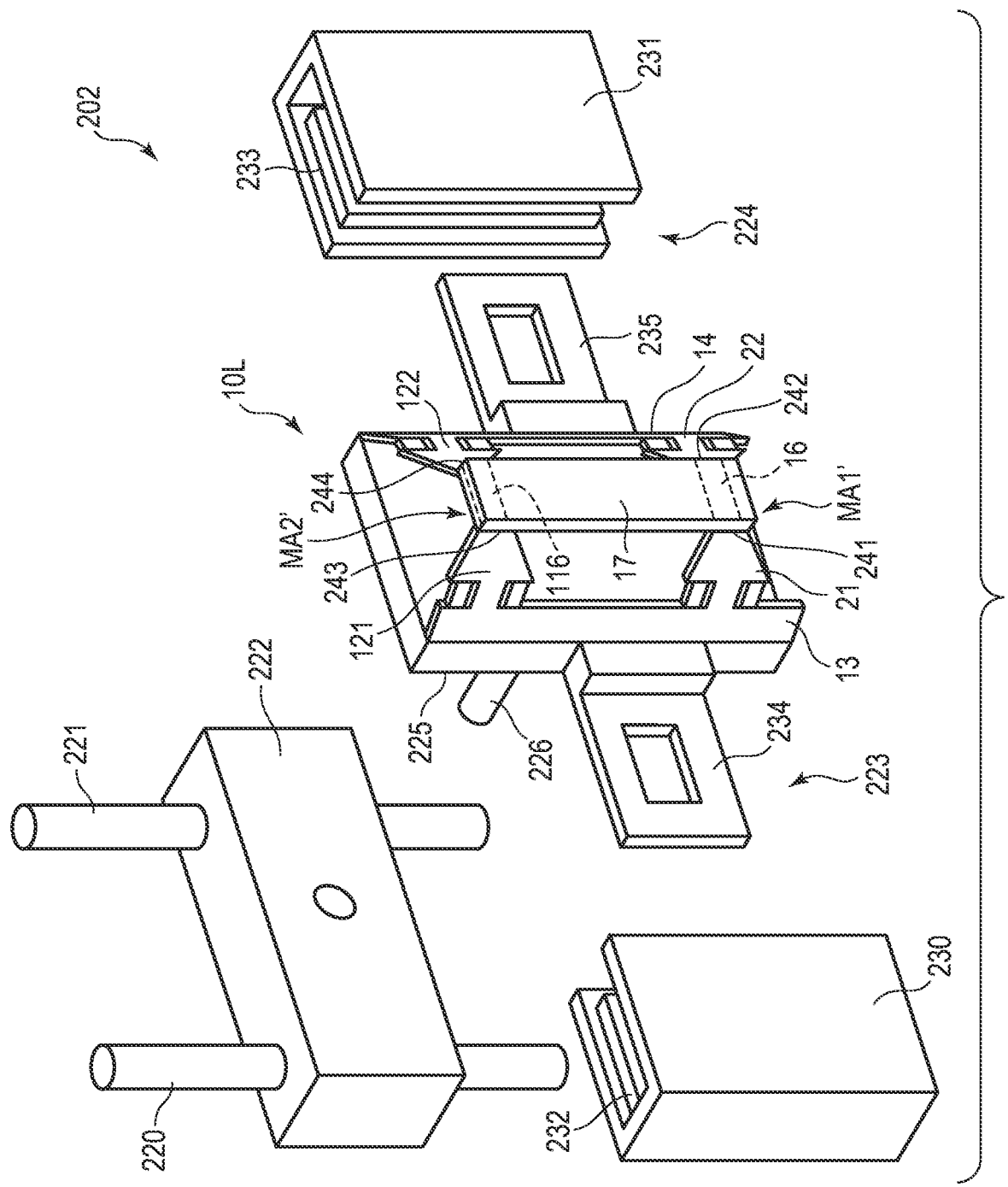
F I G. 20

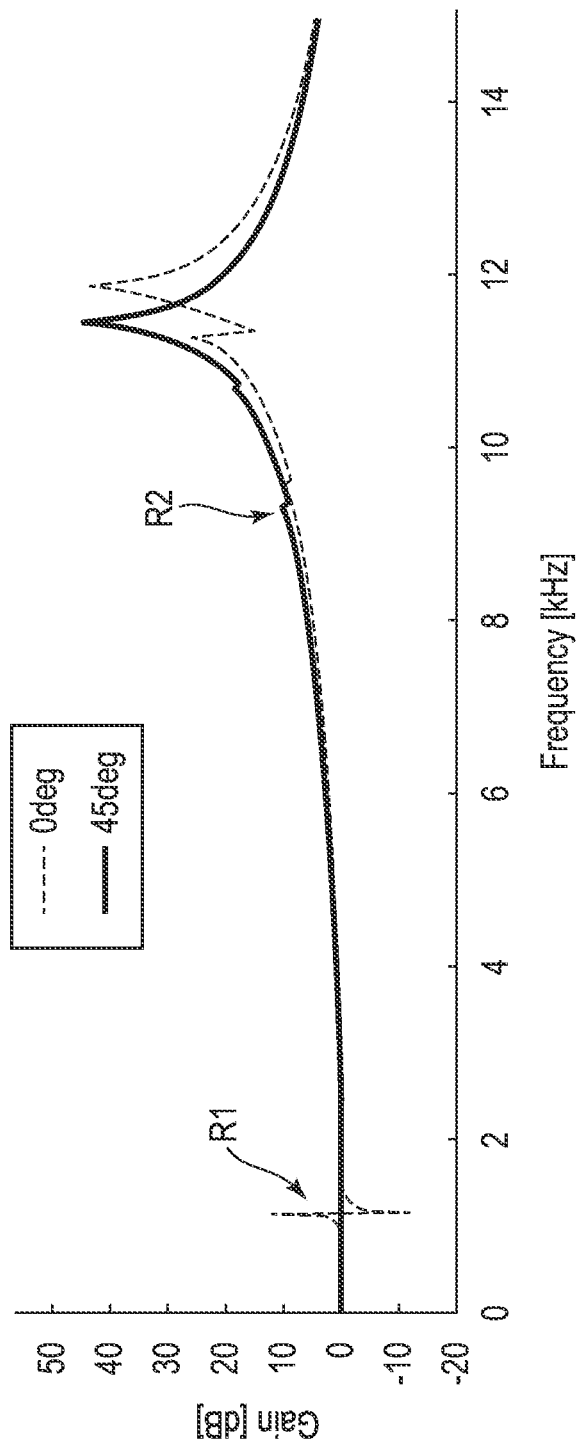
F I G. 23

HEAD DRIVING DEVICE

CROSS-REFERENCE TO RELATED APPLICATIONS

This application is based upon and claims the benefit of priority from prior Japanese Patent Application No. 2021-186537, filed Nov. 16, 2021, the entire contents of which are incorporated herein by reference.

BACKGROUND OF THE INVENTION

1. Field of the Invention

The present invention relates to a head driving device of a data storage device using tape as a recording medium.

2. Description of the Related Art

Data storage devices which use tape (magnetic tape) as a recording medium are known. Examples of data storage devices are described in U.S. Pat. No. 10,971,184 B (Patent Literature 1) and JP 2020-129424 A (Patent Literature 2). These data storage devices comprise a case, tape accommodated in the case, a tape winding mechanism, a head assembly, etc. Data is magnetically recorded in the tape. The head assembly includes a magnetic head, a head driving device which relatively moves the magnetic head with respect to the tape, etc. An element provided in the magnetic head performs access such as reading of data recorded in the tape and wiring of data.

The head driving device of the data storage device described in Patent Literature 1 includes a head stack assembly and a voice coil motor for moving the head stack assembly. A head arm comprising a spring function is provided at the distal end of the head stack assembly. A magnetic head is mounted on the head arm. The magnetic head moves in the width direction of the tape by the voice coil motor.

The head driving device of the data storage device described in Patent Literature 2 includes a coarse motion actuator and a micromotion actuator to correspond to the increase in the recording density of tape. The coarse motion actuator moves the magnetic head with a stroke which is relatively large. The micromotion actuator moves the magnetic head with a stroke which is relatively small. A stepping motor or a voice coil motor (VCM) is used for the coarse motion actuator. A piezoelectric element such as lead zirconate titanate (PZT) may be used for the micromotion actuator.

In the head driving device of Patent Literature 1, a small magnetic head moves in the width direction of the tape by the voice coil motor. In this type of conventional device, the tape may be damaged by contact with the magnetic head. In addition, in the conventional device, it is difficult to stably hold the magnetic head in a predetermined position with respect to the tape which moves at high speed. In another conventional device, a large magnetic head having a length corresponding to the width of tape may be used. However, the large magnetic head is heavy. Thus, it is difficult to stably support the magnetic head by a head arm comprising a suspension function.

The head driving device of Patent Literature 2 comprises the coarse actuator consisting of a voice coil motor, and the micromotion actuator consisting of a piezoelectric element. This type of conventional device has some problems. For example, the structure is complicated, and the number of components is increased.

Hard disk drives which use a disk as a recording medium are known. In the case of hard disk drives, an air bearing is formed between the surface of the disk and a magnetic head. In the head driving device of Patent Literature 2, tape is used as a recording medium. Therefore, in the head driving device of Patent Literature 2, to prevent the damage of the tape when the tape is fast wound or fast rewound, a structure in which the tape is in contact with the magnetic head is adopted. However, in this conventional device, the structure of the head driving device is further complicated.

An object of the present invention is to provide a head driving device which can stably hold a head member and function as a micromotion actuator.

BRIEF SUMMARY OF THE INVENTION

According to an embodiment, a head driving device comprises a head supporting portion supporting a head member, a first beam, a first base side hinge portion, a first head side hinge portion, a second beam, a second base side hinge portion, a second head side hinge portion, a first piezoelectric unit, and a second piezoelectric unit. The head driving device comprises first and second base portions facing each other across an intervening space. The head supporting portion is provided between the first base portion and the second base portion. The first beam extends from the first base portion to the head supporting portion. The first base side hinge portion connects a base portion of the first beam to the first base portion. The first head side hinge portion connects a distal end of the first beam to the head supporting portion.

The second beam is provided on an opposite side of the first beam across the intervening head supporting portion. The second beam extends from the second base portion to the head supporting portion. The second base side hinge portion connects a base portion of the second beam to the second base portion. The second head side hinge portion connects a distal end of the second beam to the head supporting portion. The first piezoelectric unit is provided between the first base portion and the base portion of the first beam. The first piezoelectric unit displaces the distal end of the first beam by deforming in a state where voltage is applied. The second piezoelectric unit is provided between the second base portion and the base portion of the second beam. The second piezoelectric unit displaces the distal end of the second beam by deforming in a state where voltage is applied.

The head driving device of the present invention can stably hold the head member and function as a micromotion actuator.

A width of the first base side hinge portion may be less than a width of the base portion of the first beam, and a width of the first head side hinge portion may be less than a width of the distal end of the first beam. A width of the second base side hinge portion may be less than a width of the base portion of the second beam, and a width of the second head side hinge portion may be less than a width of the distal end of the second beam.

According to the embodiment, the head driving device has a taper shape. Here, the taper shape indicates that a planar shape of the first beam is a shape in which a width is decreased from the base portion of the first beam to the distal end of the first beam. Further, a planar shape of the second beam is a shape in which a width is decreased from the base portion of the second beam to the distal end of the second beam.

In the head driving device, first element accommodation portions may be provided on both sides of the first base side hinge portion. A pair of first piezoelectric elements constituting the first piezoelectric unit is provided in the first element accommodation portions. Second element accommodation portions may be provided on both sides of the second base side hinge portion. A pair of second piezoelectric elements constituting the second piezoelectric unit is provided in the second element accommodation portions.

According to the embodiment, one of the first piezoelectric elements may be provided in the first element accommodation portion with a predetermined polarity. The other one of the first piezoelectric elements is provided in the first element accommodation portion such that it turns around thereby having an opposite polarity. One of the paired second piezoelectric elements may be provided in the second element accommodation portion with a predetermined polarity. The other one of the paired second piezoelectric elements is provided in the second element accommodation portion such that it turns around thereby having an opposite polarity.

According to the embodiment, as exemplarily shown in FIG. 3, the head driving device may comprise first and second suspensions made of a metal plate member. The first suspension includes the first beam, the first base side hinge portion and the first head side hinge portion. The second suspension includes the second beam, the second base side hinge portion and the second head side hinge portion. The second suspension forms a line-symmetric shape with the first suspension with respect to an axis which passes through a center of the head supporting portion.

For example, as shown in FIG. 10, the head driving device comprising the first suspension and the second suspension may comprise a first bent portion and a second bent portion. The first bent portion is formed in the first suspension. The second bent portion is formed in the second suspension. The first bent portion bends at an angle less than or equal to 90° in a thickness direction of the plate member with respect to the head supporting portion. The second bent portion bends at a same angle with the first bent portion on a same side as the first bent portion with respect to the head supporting portion.

The head driving device of each of some embodiments may comprise a damper member provided in at least part of the first beam, the second beam and the head supporting portion as shown in FIG. 5 to FIG. 9.

As shown in FIG. 14 to FIG. 17, a first milliactuator assembly and a second milliactuator assembly may be provided. The first milliactuator assembly includes a first head supporting portion, a first suspension and a second suspension. The second milliactuator assembly includes a second head supporting portion, a third suspension and a fourth suspension. These first to fourth suspensions may consist of a common metal plate member and may comprise substantially a common structure.

The first suspension and the second suspension are line-symmetric with respect to an axis which passes through a center of the first head supporting portion. The third suspension and the fourth suspension are line-symmetric with respect to an axis which passes through a center of the second head supporting portion. The first head supporting portion and the second head supporting portion may be connected to each other by a connection portion.

For example, like the three-dimensional head driving device shown in FIG. 18 to FIG. 22, a first bent portion, a second bent portion, a third bent portion and a fourth bent portion may be provided. The first bent portion is formed in the first suspension. The first bent portion bends at an angle less than or equal to 90° in a thickness direction of the plate member with respect to the first head supporting portion. The second bent portion is formed in the second suspension. The second bent portion bends on a same side as the first bent portion at a same angle as the first bent portion with respect to the first head supporting portion.

The third bent portion is formed in the third suspension. The third bent portion bends on the same side as the first bent portion at the same angle as the first bent portion with respect to the second head supporting portion. The fourth bent portion is formed in the fourth suspension. The fourth bent portion bends on a same side as the second bent portion at a same angle as the second bent portion with respect to the second head supporting portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 13A is a plan view showing head driving device comprising a damper member according to a comparative example 1.

FIG. 13B is a plan view showing head driving device comprising a damper member according to a comparative example 2.

FIG. 14 is a perspective view of a head driving device according to a sixth embodiment.

FIG. 18 is a front view schematically showing a data storage device comprising a head driving device according to a ninth embodiment.

FIG. 19 is a perspective view of the actuator assembly of the data storage device shown in FIG. 18.

FIG. 20 is an exploded perspective view of the actuator assembly shown in FIG. 19.

FIG. 23 is a diagram showing the vibration property of the head driving device shown in FIG. 19 and the vibration property of the head driving device shown in FIG. 14.

DETAILED DESCRIPTION OF THE INVENTION

[First Embodiment] (FIG. 1 to FIG. 4)

This specification hereinafter explains a head driving device 10A according to a first embodiment with reference to FIG. 1 to FIG. 4.

Figure 1:
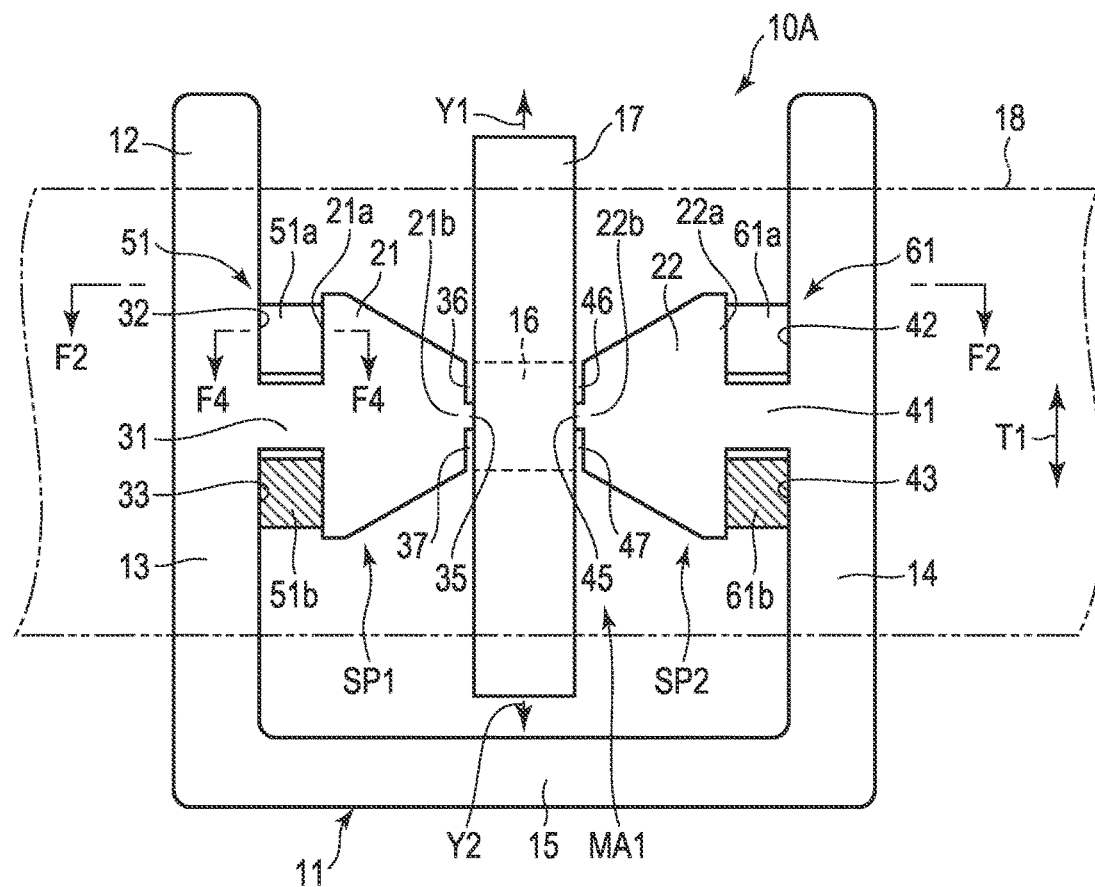
FIG. 1 is a plan view of a head driving device according to a first embodiment.
Figure 2:
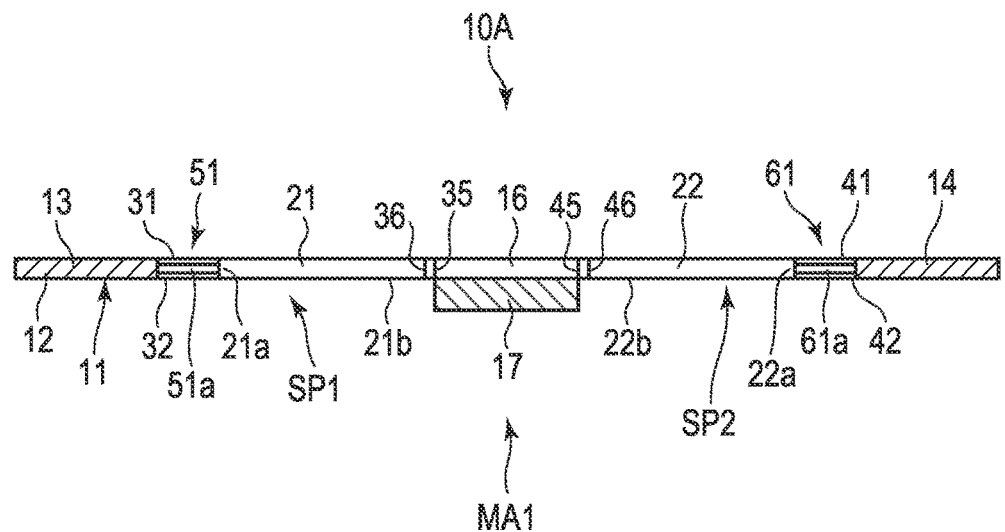
FIG. 2 is a cross-sectional view of the head driving device along the F2-F2 line of FIG. 1.
Figure 3:
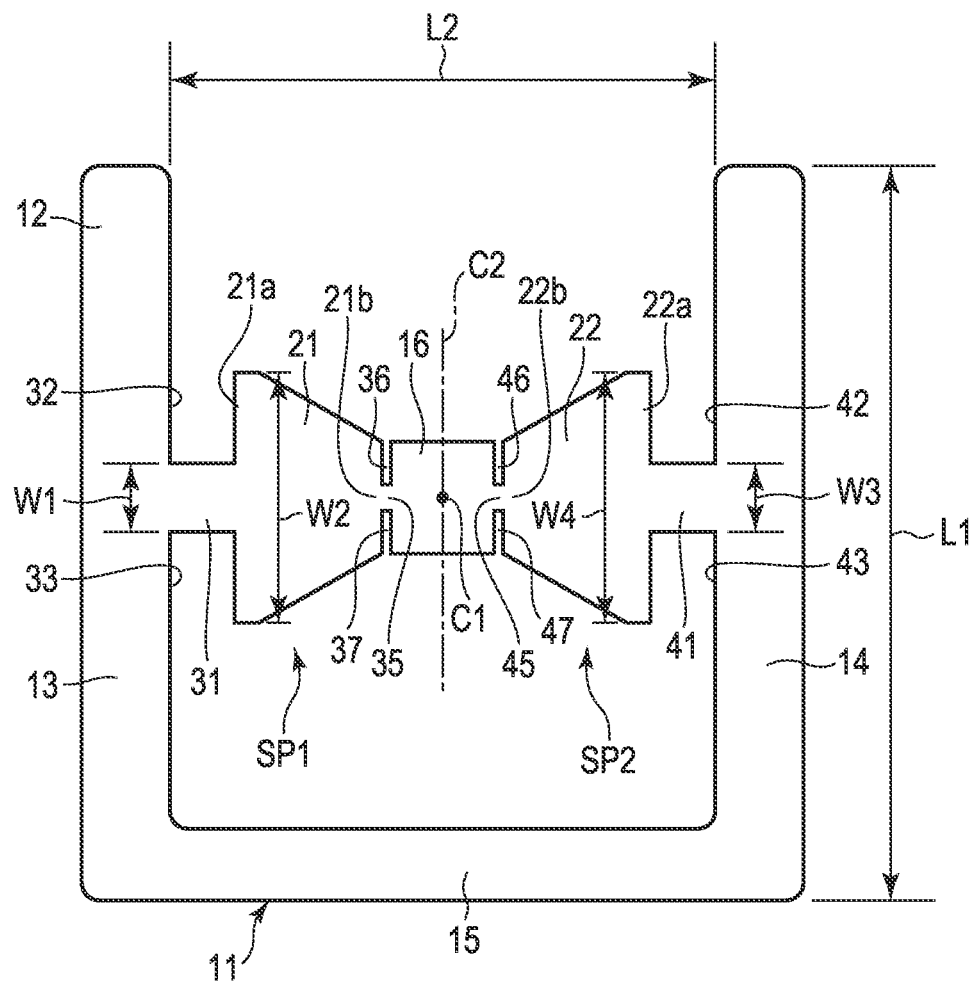
FIG. 3 is a plan view of the plate member of the head driving device shown in FIG. 1.

FIG. 1 is a plan view of the head driving device 10A. FIG. 2 is a cross-sectional view of the head driving device 10A along the F2-F2 line of FIG. 1. The head driving device 10A comprises a flat plate member 11 formed of metal (for example, stainless steel). FIG. 3 is a plan view of the plate member 11. The thickness of the plate member 11 is 0.1 to 0.3 mm (for example, 0.15 mm). For example, length L1 of the plate member 11 is 20 mm. However, length L1 may be different from this example.

A frame portion 12 is formed in part of the plate member 11. The frame portion 12 includes a first base portion 13 and a second base portion 14. The first base portion 13 faces the second base portion 14 across an intervening space. The first base portion 13 and the second base portion 14 are connected to each other by a bridge portion 15. Thus, the relative locations of the first base portion 13 and the second base portion 14 do not substantially change. For example, distance L2 (shown in FIG. 3) between the first base portion 13 and the second base portion 14 is 15 mm. However, distance L2 may be different from this example.

In the center between the first base portion 13 and the second base portion 14, a head supporting portion 16 is provided. The head supporting portion 16 supports a head member 17 which functions as a magnetic head. The head member 17 may be called a head bar or a slider. The head member 17 is fixed to the head supporting portion 16 by a fixing means such as an adhesive.

The head member 17 extends in the width direction T1 of magnetic tape 18 (partly shown by two-dot chain lines in FIG. 1) as a recording medium. The head member 17 is an example of a recording medium.

Elements which can convert a magnetic signal into an electric signal such as an MR (Magneto Resistive) element are provided in the head member 17. By these elements, access such as data writing or reading with respect to the magnetic tape 18 is performed.

The head driving device 10A includes a first beam 21 and a second beam 22. The first beam 21 extends from the first base portion 13 to the head supporting portion 16. The second beam 22 is provided on the 180-degree opposite side of the first beam 21 across the intervening head supporting portion 16. The second beam 22 extends from the second base portion 14 to the head supporting portion 16.

FIG. 1 is a plan view of the head driving device 10A. As shown in FIG. 1, the planar shape of the first beam 21 is a taper shape in which the width is decreased from a base portion 21a to a distal end 21b. In this specification, the planar shape refers to the shape of the first beam 21 when the first beam 21 is viewed in a direction facing the plane of the plate member 11 (plan view). The planar shape of the second beam 22 is also a taper shape in which the width is decreased from the base portion 22a to the distal end 22b of the second beam 22.

A first base side hinge portion 31 is formed between the base portion 21a of the first beam 21 and the first base portion 13. Width W1 (shown in FIG. 3) of the first base side hinge portion 31 is less than width W2 of the base portion 21a of the first beam 21. By the first base side hinge portion 31, the base portion 21a of the first beam 21 is connected to the first base portion 13. On the both sides of the first base side hinge portion 31, element accommodation portions 32 and 33 consisting of a recess portion are formed.

A first head side hinge portion 35 is provided between the distal end 21b of the first beam 21 and the head supporting portion 16. On the both sides of the first head side hinge portion 35, slits 36 and 37 are formed. The width of the first head side hinge portion 35 is equal to the width of the distal end 21b of the first beam 21 or less than the width of the distal end 21b. By the first head side hinge portion 35, the distal end 21b of the first beam 21 is connected to the head supporting portion 16.

A second base side hinge portion 41 is provided between the base portion 22a of the second beam 22 and the second base portion 14. Width W3 (shown in FIG. 3) of the second base side hinge portion 41 is less than width W4 of the base portion 22a of the second beam 22. By the second base side hinge portion 41, the base portion 22a of the second beam 22 is connected to the second base portion 14. On the both sides of the second base side hinge portion 41, element accommodation portions 42 and 43 consisting of a recess portion are formed.

A second head side hinge portion 45 is provided between the distal end 22b of the second beam 22 and the head supporting portion 16. On the both sides of the second head side hinge portion 45, slits 46 and 47 are formed. The width of the second head side hinge portion 45 is equal to the width of the distal end 22b of the second beam 22 or less than the width of the distal end 22b. By the second head side hinge portion 45, the distal end 22b of the second beam 22 is connected to the head supporting portion 16.

A first piezoelectric unit 51 is provided between the first base portion 13 and the base portion 21a of the first beam 21. The first piezoelectric unit 51 includes a pair of first piezoelectric elements 51a and 51b. These piezoelectric elements 51a and 51b are formed of piezoelectric bodies such as lead zirconate titanate (PZT). The piezoelectric bodies have a property of deforming in a state where voltage is applied. The first piezoelectric elements 51a and 51b are inserted into the first element accommodation portions 32 and 33, respectively. These first piezoelectric elements 51a and 51b are fixed to the plate member 11 by an electrically insulating adhesive.

Figure 4:
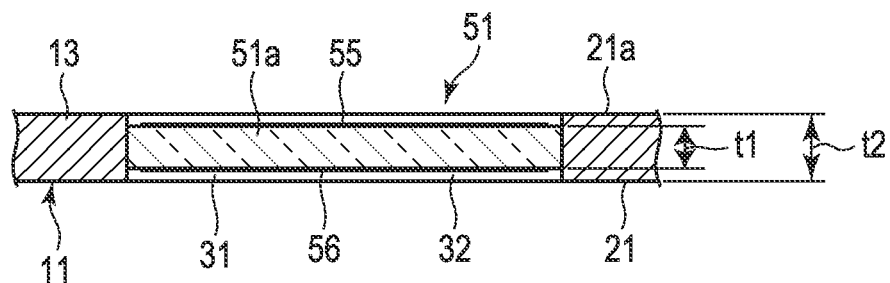
FIG. 4 is a cross-sectional view of part of the head driving device along the F4-F4 line of FIG. 1.

FIG. 4 is a cross-sectional view along the F4-F4 line of FIG. 1. FIG. 4 shows the element accommodation portion 32 and the piezoelectric element 51a. Thickness t1 of the piezoelectric element 51a is less than thickness t2 of the plate member 11. For example, thickness t1 of the piezoelectric element 51a is 0.1 mm. However, thickness t1 may be different from this example. On a surface of the piezoelectric element 51a, a first electrode 55 consisting of a metal thin film is formed. On the other surface of the piezoelectric element 51a, a second electrode 56 consisting of a metal thin film is formed. When voltage is applied to these electrodes 55 and 56, the piezoelectric element 51a deforms (expands and contracts) based on a direction in which current flows. The direction in which the piezoelectric elements 51a and 51b expand and contract is the length direction of the first beam 21. The piezoelectric elements 51a and 51b comprise a common structure.

The piezoelectric element 51a is accommodated in the element accommodation portion 32 with a predetermined polarity so as to expand or contract based on the polarity of the applied voltage. The polarity is plus or minus. The piezoelectric element 51b is also accommodated in the element accommodation portion 32 with a predetermined polarity so as to expand or contract based on the polarity of the applied voltage. In FIG. 1, the piezoelectric element 51b is shown by hatching. In the case of the present embodiment (FIG. 1), the piezoelectric element 51a and the piezoelectric element 51b are accommodated in the element accommodation portion 33 such that they face opposite directions. Thus, the piezoelectric element 51a and the piezoelectric element 51b have opposite polarities.

When the piezoelectric element 51a contracts by the application of voltage, and the piezoelectric element 51b expands, the distal end 21b of the first beam 21 is displaced in a first direction (shown by arrow Y1 in FIG. 1). When the piezoelectric element 51a expands and the piezoelectric element 51b contracts, the distal end 21b of the first beam 21 is displaced in a second direction (shown by arrow Y2 in FIG. 1).

A second piezoelectric unit 61 is provided between the second base portion 14 and the base portion 22a of the second beam 22. The second piezoelectric unit 61 includes a pair of second piezoelectric elements 61a and 61b. These piezoelectric elements 61a and 61b are inserted into the second element accommodation portions 42 and 43, respectively. These piezoelectric elements 61a and 61b are fixed to the plate member 11 by an electrically insulating adhesive. The second piezoelectric elements 61a and 61b consist of piezoelectric bodies comprising the same structure as the first piezoelectric elements 51a and 51b.

The piezoelectric element 61a of the second piezoelectric unit 61 shown in FIG. 1 is accommodated in the element accommodation portion 42 with a predetermined polarity so as to expand or contract based on the polarity of the applied voltage. The piezoelectric element 61b is accommodated in the element accommodation portion 43 such that it faces the opposite direction of the piezoelectric element 61a thereby having the opposite polarity of the piezoelectric element 61a. The piezoelectric element 61b is shown by hatching.

When the piezoelectric element 61a contracts by the application of voltage, and the piezoelectric element 61b expands, the distal end 22b of the second beam 22 is displaced in the first direction (shown by arrow Y1 in FIG. 1). When the piezoelectric element 61a expands and the piezoelectric element 61b contracts, the distal end 22b of the second beam 22 is displaced in the second direction (shown by arrow Y2). When the distal end 22b of the second beam 22 is displaced in the same direction as the distal end 21b of the first beam 21, the head member 17 moves in the first direction Y1 or the second direction Y2.

The first beam 21, the first base side hinge portion 31 and the first head side hinge portion 35 constitute a first suspension SP1. The second beam 22, the second base side hinge portion 41 and the second head side hinge portion 45 constitute a second suspension SP2. These suspensions SP1 and SP2, the head supporting portion 16, the first piezoelectric unit 51 and the second piezoelectric unit 61 constitute a milliactuator assembly MA1.

The first suspension SP1 and the second suspension SP2 are line-symmetric with respect to axis C2 (shown in FIG. 3) which passes through center C1 of the head supporting portion 16. The first beam 21 and the second beam 22 extend in a direction perpendicular to axis C2. The first suspension SP1 and the second suspension SP2 consist of the common plate member 11 formed of stainless steel. The thickness of the first suspension SP1 is equal to the thickness of the second suspension SP2.

[Second to Fifth Embodiments] (FIG. 5 to FIG. 9)

Figure 5:
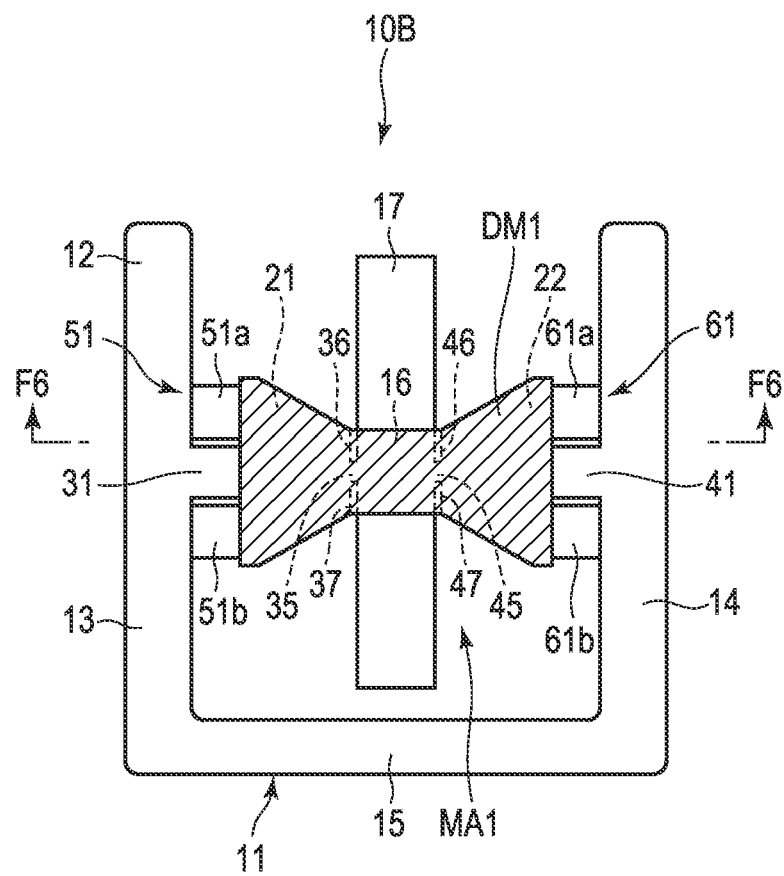
FIG. 5 is a plan view of a head driving device according to a second embodiment in which a damper member is shown by hatching.
Figure 6:
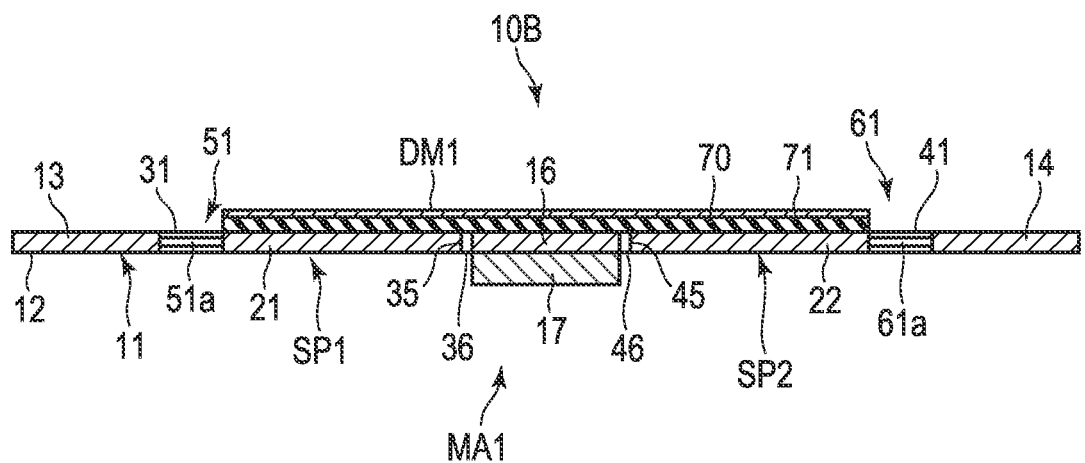
FIG. 6 is a cross-sectional view of the head driving device along the F6-F6 line of FIG. 5.

FIG. 5 shows a head driving device 10B according to a second embodiment. FIG. 6 is a cross-sectional view of the head driving device 10B along the F6-F6 line of FIG. 5. The head driving device 10B comprises a damper member DM1. Since the other structures are common to the head driving device 10A of the first embodiment and the head driving device 10B, explanations thereof are omitted by adding common reference numbers to common structural elements.

As shown in FIG. 6, the damper member DM1 comprises a viscoelastic material layer 70 and a constrained plate 71. The viscoelastic material layer 70 is formed of a polymeric material which can exert viscosity resistance when it is deformed. For example, the polymeric material is acrylic resin and has viscosity. The constrained plate 71 is formed of synthetic resin such as polyester. The constrained plate 71 overlaps the viscoelastic material layer 70.

The damper member DM1 shown in FIG. 5 covers a head supporting portion 16, the entire part of a first beam 21 and the entire part of a second beam 22. For convenience sake, in FIG. 5, the damper member DM1 is shown by hatching. As shown in FIG. 6, the damper member DM1 also covers slits 36, 37, 46 and 47.

Figure 7:
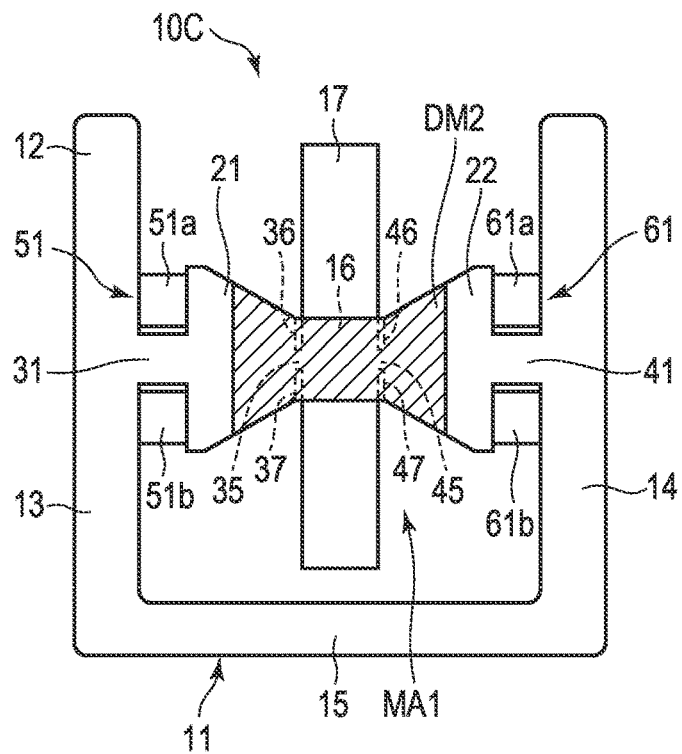
FIG. 7 is a plan view of a head driving device according to a third embodiment in which a damper member is shown by hatching.

FIG. 7 shows a head driving device 10C according to a third embodiment. This head driving device 10C also comprises a damper member DM2. For convenience sake, the damper member DM2 is shown by hatching. The damper member DM2 is provided partway in the length direction of a first beam 21 from a head supporting portion 16 and partway in the length direction of a second beam 22 from the head supporting portion 16. Since the other structures are common to the head driving device 10B of the second embodiment and the head driving device 10C of the third embodiment, explanations thereof are omitted by adding common reference numbers to common structural elements. The damper member DM2 is provided in the head supporting portion 16, and at least part of the first beam 21 and the second beam 22.

Figure 8:
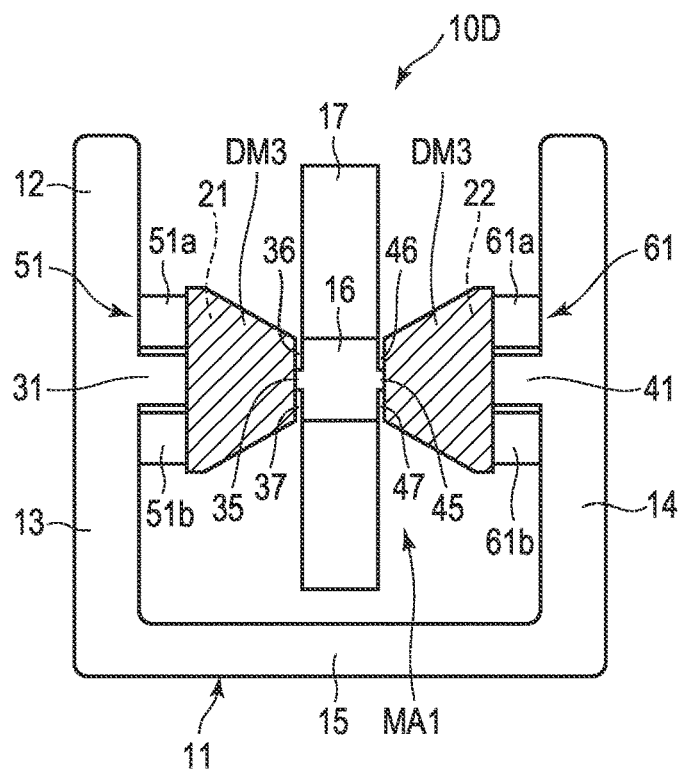
FIG. 8 is a plan view of a head driving device according to a fourth embodiment in which each damper member is shown by hatching.

FIG. 8 shows a head driving device 10D according to a fourth embodiment. This head driving device 10D comprises a pair of damper members DM3. The damper members DM3 are separately provided in a first beam 21 and a second beam 22. No damper member is provided in a head supporting portion 16. When no damper member is provided in the head supporting portion 16, each damper member may be attached to either the adverse side or back side of each of the first beam 21 and the second beam 22. Since the other structures are common to the head driving device 10B of the second embodiment and the head driving device 10D of the fourth embodiment, explanations thereof are omitted by adding common reference numbers to common structural elements.

Figure 9:
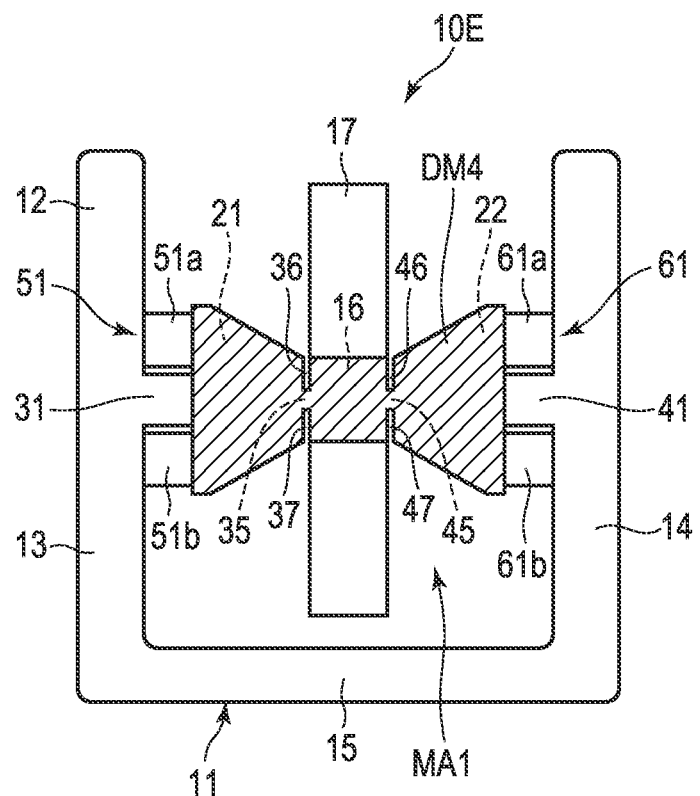
FIG. 9 is a plan view of a head driving device according to a fifth embodiment in which a damper member is shown by hatching.

FIG. 9 shows a head driving device 10E according to a fifth embodiment. A damper member DM4 provided in this head driving device 10E covers a head supporting portion 16, the entire part of a first beam 21 and the entire part of a second beam 22. None of slits 36, 37, 46 and 47 is covered with the damper member DM4. Since the other structures are common to the head driving device 10B of the second embodiment and the head driving device 10E of the fifth embodiment, explanations thereof are omitted by adding common reference numbers to common structural elements.

Figure 10:
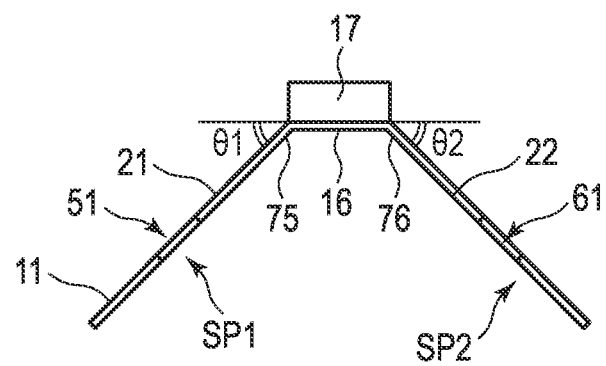
FIG. 10 is a side view of the head driving device comprising a first bent portion and a second bent portion.

The head driving device shown in FIG. 10 comprises a first bent portion 75 formed in the first suspension SP1, and a second bent portion 76 formed in the second suspension SP2. The first bent portion 75 is bent at angle θ1 less than or equal to 90° in the thickness direction of the plate member 11 with respect to the head supporting portion 16. The second bent portion 76 is bent at the same angle θ2 as the first bent portion 75 to the same side as the first bent portion 75 with respect to the head supporting portion 16. As the head driving device shown in FIG. 10 comprises the bent portions 75 and 76, the head driving device has a three-dimensional shape like a mountain.

Figure 11:
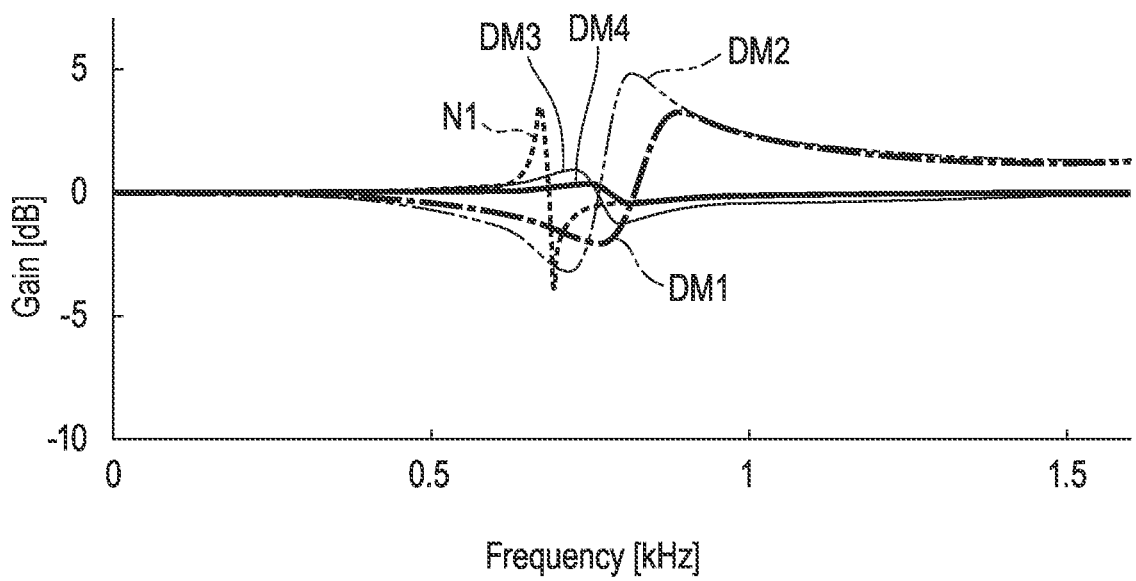
FIG. 11 is a diagram showing the vibration property of 0 to 1.5 kHz of the head driving devices according to the second embodiment to the fifth embodiment.

FIG. 11 shows the vibration property of the first mode of 0 to 1.5 kHz regarding the head driving devices 10A to 10E of the first embodiment to the fifth embodiment. In FIG. 11, the horizontal axis indicates the frequency, and the vertical axis indicates the gain.

In FIG. 11, the broken line N1 shows the vibration property of the head driving device 10A of the first embodiment which does not comprise a damper member. In FIG. 11, the one-dot chain line DM1 shows the vibration property of the head driving device 10B (FIG. 5) comprising the damper member DM1 according to the second embodiment. The two-dot chain line DM2 shows the vibration property of the head driving device 10C (FIG. 7) comprising the damper member DM2 according to the third embodiment. The thin line DM3 shows the vibration property of the head driving device 10D (FIG. 8) comprising the damper members DM3 according to the fourth embodiment. The solid line DM4 shows the vibration property of the head driving device 10E (FIG. 9) comprising the damper member DM4 according to the fifth embodiment.

As shown by the broken line N1 in FIG. 11, the peak of the resonance of the head driving device of the first embodiment which does not comprise a damper member is steep. To the contrary, in each of the head driving devices of the second to fifth embodiments which comprise the damper member, the peak of resonance is moderate. In particular, the peak of the resonance of the head driving device 10E (FIG. 9) of the fifth embodiment shown by the solid line DM4 is the least. For this reason, regarding the vibration property of 0 to 1.5 kHz, the damper member DM4 (FIG. 9) of the fifth embodiment may be preferable.

Figure 12:
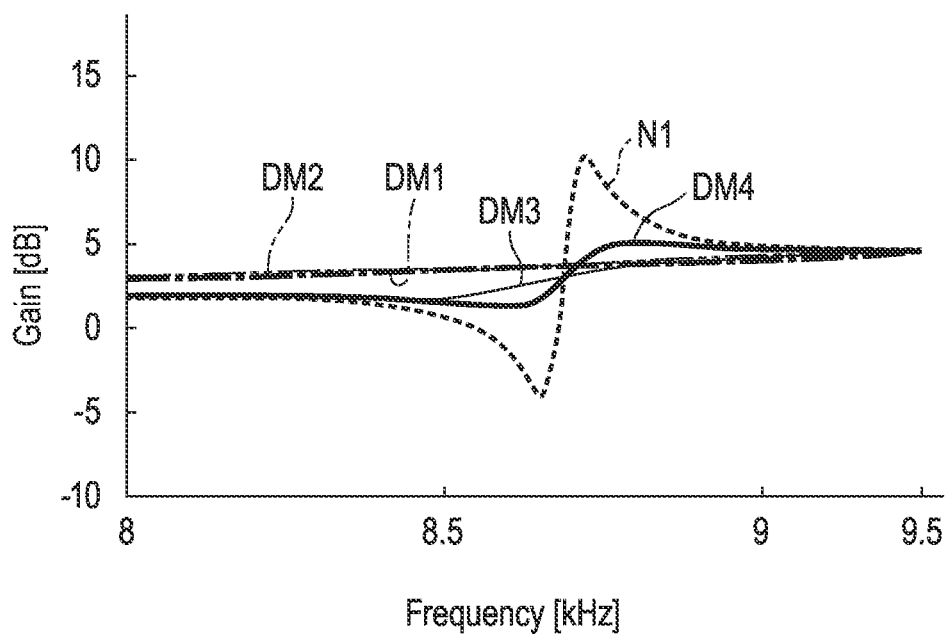
FIG. 12 is a diagram showing the vibration property of 8 to 9.5 kHz of the head driving devices according to the second embodiment to the fifth embodiment.

FIG. 12 shows the vibration property of the first mode of 8 to 9.5 kHz regarding the head driving devices 10A to 10E of the first embodiment to the fifth embodiment. In FIG. 12, the horizontal axis indicates the frequency, and the vertical axis indicates the gain.

In FIG. 12, the broken line N1 shows the vibration property of the head driving device 10A of the first embodiment which does not comprise a damper member. In FIG. 12, the one-dot chain line DM1 shows the vibration property of the head driving device 10B (FIG. 5) comprising the damper member DM1 according to the second embodiment. The two-dot chain line DM2 shows the vibration property of the head driving device 10C (FIG. 7) comprising the damper member DM2 according to the third embodiment. The thin line DM3 shows the vibration property of the head driving device 10D (FIG. 8) comprising the damper members DM3 according to the fourth embodiment. The solid line DM4 shows the vibration property of the head driving device 10E (FIG. 9) comprising the damper member DM4 according to the fifth embodiment.

As shown by the broken line N1 in FIG. 12, the peak of the resonance of the head driving device of the first embodiment which does not comprise a damper member is great. To the contrary, in each of the head driving devices of the second to fifth embodiments which comprise the damper member, the peak of resonance is less. In particular, each of the resonance mode of the head driving device 10B comprising the damper member DM1 of the second embodiment (FIG. 5) and the resonance mode of the head driving device 10C comprising the damper member DM2 of the third embodiment (FIG. 7) is substantially flat. For this reason, regarding the vibration property of 8 to 9.5 kHz, the damper member DM1 of the second embodiment and the damper member DM2 of the third embodiment may be preferable.

[Comparative Example 1] (FIG. 13A)

FIG. 13A shows a head driving device 10F according to comparative example 1. A damper member DM5 provided in this head driving device 10F comprises a first extending portion 81 and a second extending portion 82. The first extending portion 81 extends from a first base side hinge portion 31 to a first base portion 13. The second extending portion 82 extends from a second base side hinge portion 41 to a second base portion 14. The other structures are common to the head driving device 10B of the second embodiment and the head driving device 10F of comparative example 1.

The vibration property of the head driving device 10F of comparative example 1 is equivalent to that of the head driving device 10B of the second embodiment. However, the damper member DM5 of comparative example 1 has a drawback in respect that the shape is complicated and it is heavy compared to the damper member DM1 of the second embodiment.

[Comparative Example 2] (FIG. 13B)

FIG. 13B shows a head driving device 10G according to comparative example 2. A damper member DM6 provided in this head driving device 10G comprises an extending portion 83 covering a first piezoelectric unit 51, and an extending portion 84 covering a second piezoelectric unit 61. The other structures are common to the head driving device 10B of the second embodiment and the head driving device 10G of comparative example 2.

Regarding the vibration property of the head driving device 10G of comparative example 2, the gain of the first mode is large compared to the head driving device 10B of the second embodiment. In addition, the damper member DM6 of comparative example 2 has a drawback in respect that it is heavier than the damper member DM1 of the second embodiment. These factors show that the damper member should be preferably provided so as not to cover the base side hinge portion 31 or 41, or the piezoelectric unit 51 or 61.

Figure 15:
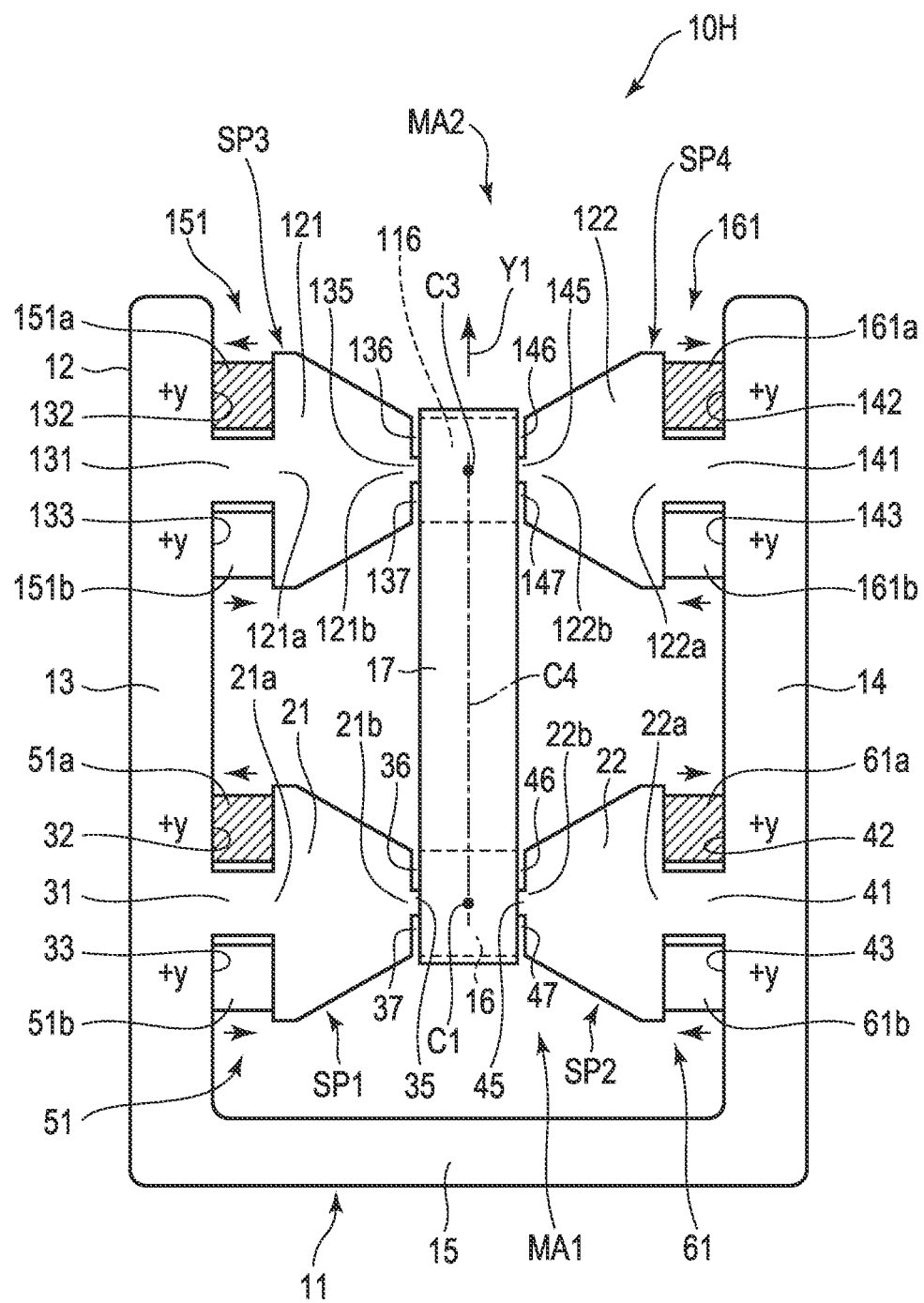
FIG. 15 is a plan view of the head driving device shown in FIG. 14.

[Sixth Embodiment] (FIG. 14 and FIG. 15) This specification hereinafter explains a head driving device 10H according to a sixth embodiment with reference to FIG. 14 and FIG. 15. FIG. 14 is a perspective view of the head driving device 10H. FIG. 15 is a plan view of the head driving device 10H.

The head driving device 10H comprises a first milliactuator assembly MA1 and a second milliactuator assembly MA2. The first milliactuator assembly MA1 is structured in the same manner as the milliactuator assembly MA1 of the first embodiment (FIG. 1 to FIG. 4). For this reason, the second milliactuator assembly MA2 is explained below.

The second milliactuator assembly MA2 shown in FIG. 14 and FIG. 15 includes a third suspension SP3 and a fourth suspension SP4. The third suspension SP3 and a first suspension SP1 comprise a common structure. The fourth suspension SP4 and a second suspension SP2 comprise a common structure.

In the center between a first base portion 13 and a second base portion 14, a first head supporting portion 16 and a second head supporting portion 116 are provided. The second head supporting portion 116 is provided in another position in the length direction of a head member 17 with respect to the first head supporting portion 16. By these first and second head supporting portions 16 and 116, the head member 17 is supported. The head member 17 is fixed to the first head supporting portion 16 and the second head supporting portion 116 by a fixing means such as an adhesive.

The second milliactuator assembly MA2 includes the second head supporting portion 116, a third beam 121 and a fourth beam 122. The third beam 121 extends from the first base portion 13 to the second head supporting portion 116. The fourth beam 122 is provided on the 180-degree opposite side of the third beam 121 across the intervening second head supporting portion 116. The fourth beam 122 extends from the second base portion 14 to the second head supporting portion 116.

FIG. 15 is a plan view of the head driving device 10H. The planar shape of the third beam 121 is a taper shape in which the width is decreased from the base portion 121a to the distal end 121b of the third beam 121. The planar shape of the fourth beam 122 is also a taper shape in which the width is decreased from the base portion 122a to the distal end 122b of the fourth beam 122.

A third base side hinge portion 131 is formed between the base portion 121a of the third beam 121 and the first base portion 13. The width of the third base side hinge portion 131 is less than the width of the base portion 121a of the third beam 121. By the third base side hinge portion 131, the base portion 121a of the third beam 121 is connected to the first base portion 13. On the both sides of the third base side hinge portion 131, element accommodation portions 132 and 133 consisting of a recess portion are formed.

A third head side hinge portion 135 is provided between the distal end 121b of the third beam 121 and the second head supporting portion 116. On the both sides of the third head side hinge portion 135, slits 136 and 137 are formed. The width of the third head side hinge portion 135 is equal to the width of the distal end 121b of the third beam 121 or less than the width of the distal end 121b. By the third head side hinge portion 135, the distal end 121b of the third beam 121 is connected to the second head supporting portion 116.

A fourth base side hinge portion 141 is provided between the base portion 122a of the fourth beam 122 and the second base portion 14. The width of the fourth base side hinge portion 141 is less than the width of the base portion 122a of the fourth beam 122. By the fourth base side hinge portion 141, the base portion 122a of the fourth beam 122 is connected to the second base portion 14. On the both sides of the fourth base side hinge portion 141, element accommodation portions 142 and 143 consisting of a recess portion are formed.

A fourth head side hinge portion 145 is provided between the distal end 122b of the fourth beam 122 and the second head supporting portion 116. On the both sides of the fourth head side hinge portion 145, slits 146 and 147 are formed. The width of the fourth head side hinge portion 145 is equal to the width of the distal end 122b of the fourth beam 122 or less than the width of the distal end 122b. By the fourth head side hinge portion 145, the distal end 122b of the fourth beam 122 is connected to the second head supporting portion 116.

A third piezoelectric unit 151 is provided between the first base portion 13 and the base portion 121a of the third beam 121. The third piezoelectric unit 151 includes a pair of piezoelectric elements 151a and 151b. The piezoelectric elements 151a and 151b are formed of piezoelectric bodies such as lead zirconate titanate (PZT). The piezoelectric bodies deform in a state where voltage is applied. The piezoelectric elements 151a and 151b are inserted into the element accommodation portions 132 and 133, respectively. The piezoelectric elements 151a and 151b are fixed to a plate member 11 by an electrically insulating adhesive.

The piezoelectric elements 151a and 151b expand or contract based on the polarity (plus or minus) of the applied voltage. For example, when the piezoelectric element 151a expands and the piezoelectric element 151b contracts, the distal end 121b of the third beam 121 is displaced in a first direction. When the piezoelectric element 151a contracts and the piezoelectric element 151b expands, the distal end 121b of the third beam 121 is displaced in a second direction.

A fourth piezoelectric unit 161 is provided between the second base portion 14 and the base portion 122a of the fourth beam 122. The fourth piezoelectric unit 161 includes a pair of piezoelectric elements 161a and 161b. These piezoelectric elements 161a and 161b are inserted into the element accommodation portions 142 and 143, respectively. The piezoelectric elements 161a and 161b are fixed to the plate member 11 by an electrically insulating adhesive.

The third beam 121, the third base side hinge portion 131 and the third head side hinge portion 135 constitute the third suspension SP3. The fourth beam 122, the fourth base side hinge portion 141 and the fourth head side hinge portion 145 constitute the fourth suspension SP4. These suspensions SP3 and SP4, the second head supporting portion 116, the third piezoelectric unit 151 and the fourth piezoelectric unit 161 constitute the second milliactuator assembly MA2.

As shown in FIG. 15, axis C4 passes through center C1 of the first head supporting portion 16. Axis C4 also passes through center C3 of the second head supporting portion 116. The third suspension SP3 and the fourth suspension SP4 are line-symmetric with respect to axis C4. The third beam 121 and the fourth beam 122 extend in a direction perpendicular to axis C4. The third suspension SP3 and the fourth suspension SP4 consist of the common plate member 11 formed of stainless steel. The thickness of the third suspension SP3 is equal to the thickness of the fourth suspension SP4.

The head member 17 of the head driving device 10H (FIG. 15) of the sixth embodiment is supported by the first milliactuator assembly MA1 and the second milliactuator assembly MA2. Thus, this head member 17 is supported in two positions in the length direction of the head member 17. In this way, in three-dimensional directions (the directions of the X-axis, Y-axis and Z-axis shown in FIG. 14), the rigidity of the head driving device 10H can be increased, thereby stabilizing the head member 17.

The four piezoelectric elements 51b, 61b, 151b and 161b shown in FIG. 14 and FIG. 15 are accommodated in the element accommodation portions 33, 43, 133 and 143 in a predetermined direction regarding the polarity.

The four piezoelectric elements 51a, 61a, 151a and 161a shown by hatching are accommodated in the element accommodation portions 32, 42, 132 and 142 such that they face the opposite direction thereby having the opposite polarity of the piezoelectric elements 51b, 61b, 151b and 161b.

As shown in FIG. 15, a plus input voltage of [d+y] is assumed to be applied to all of the piezoelectric elements. In this case, the piezoelectric elements 51b, 61b, 151b and 161b which are in the normal positions expand, and the piezoelectric elements 51a, 61a, 151a and 161a which are in a reverse state contract. By this structure, the head member 17 moves in a first direction (shown by arrow Y1).

Contrary to FIG. 15, a minus input voltage of [-y] is assumed to be applied to all of the piezoelectric elements. In this case, the piezoelectric elements 51b, 61b, 151b and 161b which are in the normal positions contract, and the piezoelectric elements 51a, 61a, 151a and 161a which are in a reverse state expand. By this structure, the head member 17 moves in a second direction (the opposite direction of arrow Y1). Thus, in the case of the present embodiment, the head member 17 can be moved in the Y-axis direction by an input signal of [±y] of one system.

Figure 16:
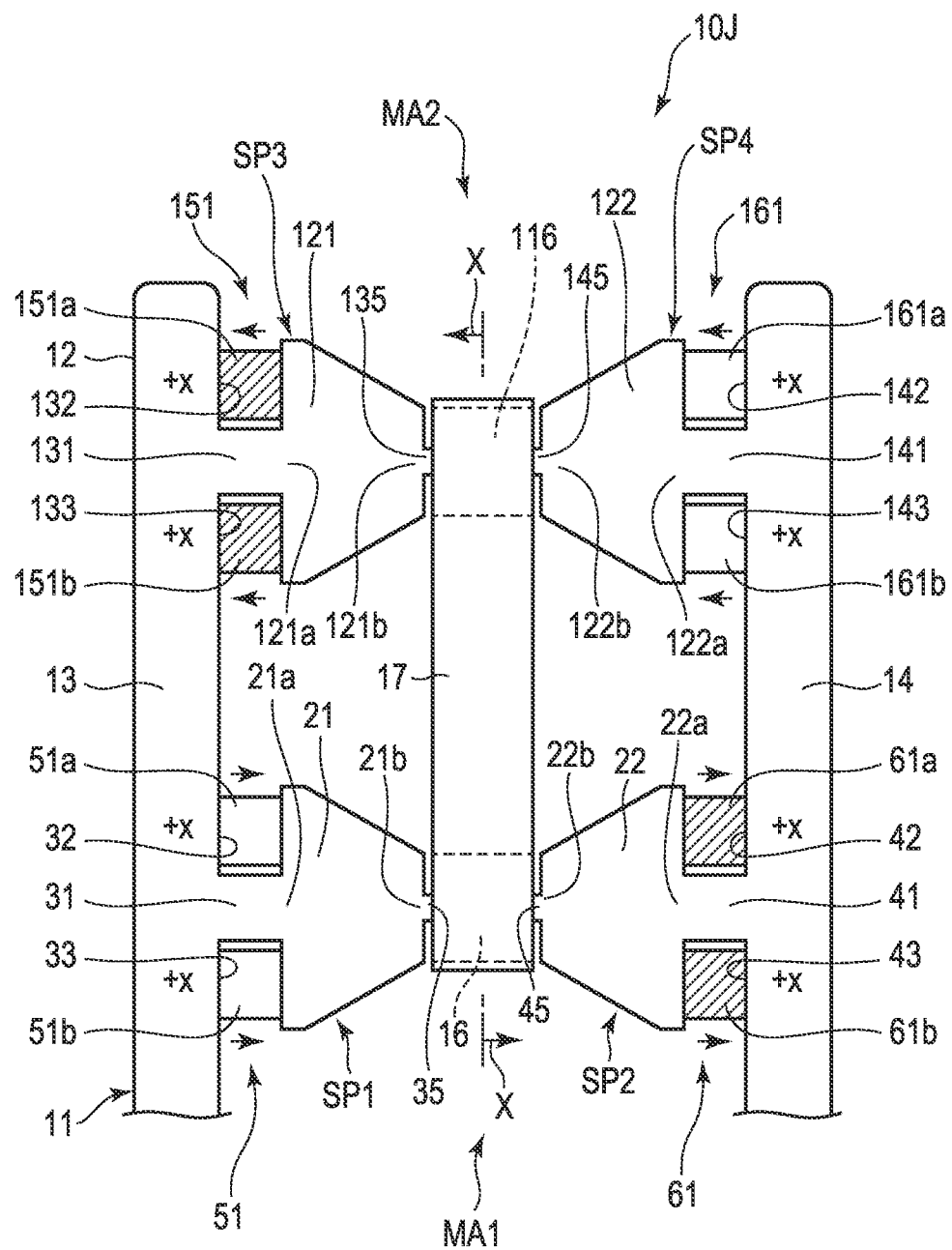
FIG. 16 is a plan view of a head driving device according to a seventh embodiment.

[Seventh Embodiment] (FIG. 16)

FIG. 16 shows a head driving device 10J according to a seventh embodiment. Piezoelectric elements 51a, 51b, 61a, 61b, 151a, 151b, 161a and 161b comprise a common structure. The piezoelectric elements 51a, 51b, 161a and 161b are accommodated in element accommodation portions 32, 33, 142 and 143 in a predetermined direction regarding the polarity. The piezoelectric elements 61a, 61b, 151a and 151b shown by hatching are accommodated in element accommodation portions 42, 43, 132 and 133 such that they turn around thereby having the opposite polarity. The other structures are the same as the sixth embodiment (FIG. 14 and FIG. 15).

As shown in FIG. 16, when a plus input voltage of [+x] is applied to all of the piezoelectric elements, the piezoelectric elements 51a, 51b, 161a and 161b which are in the normal positions expand, and the piezoelectric elements 61a, 61b, 151a and 151b which are in a reverse state contract. By this structure, a head member 17 is displaced in the skew directions shown by arrows X in FIG. 16.

Contrary to FIG. 16, when a minus input voltage of [-x] is applied to all of the piezoelectric elements, the piezoelectric elements 51a, 51b, 161a and 161b which are in the normal positions contract, and the piezoelectric elements 61a, 61b, 151a and 151b which are in a reverse state expand. By this structure, the head member 17 moves in the opposite skew directions of arrows X. In this way, the head member 17 can be driven in a skew direction by an input signal of [±x] of one system.

Figure 17:
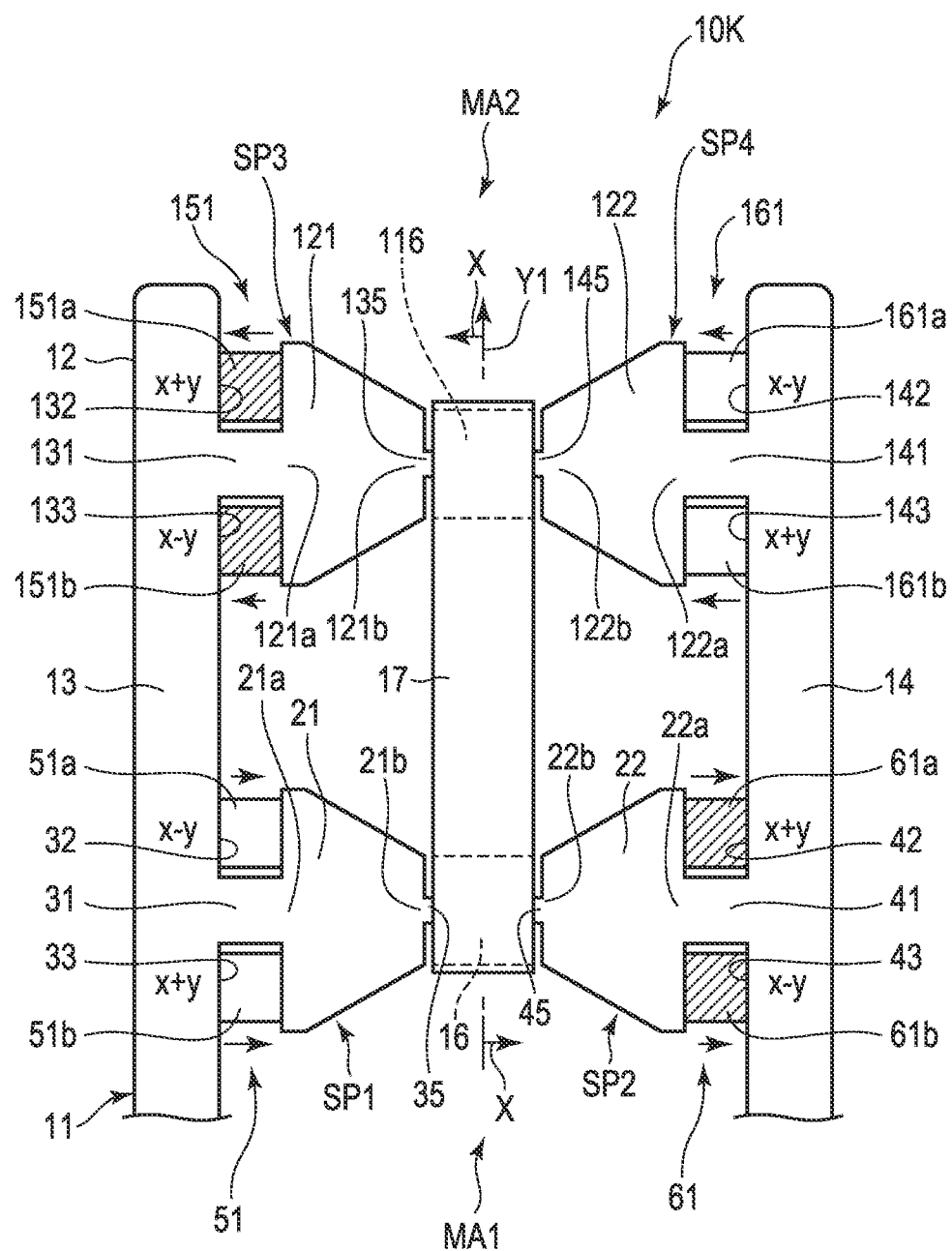
FIG. 17 is a plan view of a head driving device according to an eighth embodiment.

[Eighth Embodiment] (FIG. 17)

FIG. 17 shows a head driving device 10K according to an eighth embodiment. This head driving device 10K and the head driving device 10J of the seventh embodiment (FIG. 16) comprise a common structure. Piezoelectric elements 51a, 51b, 161a and 161b are accommodated in element accommodation portions 32, 33, 142 and 143 in a predetermined direction regarding the polarity. The piezoelectric elements 61a, 61b, 151a and 151b shown by hatching are accommodated in element accommodation portions 42, 43, 132 and 133 such that they turn around regarding the polarity.

As shown in FIG. 17, an input voltage of [x+y] is assumed to be applied to the piezoelectric elements 51b, 61a, 151a and 161b, and an input voltage of [x-y] is assumed to be applied to the piezoelectric elements 51a, 61b, 151b and 161a. In this case, a head member 17 moves in the skew directions shown by arrows X, and the head member 17 moves in a first direction (shown by arrow Y1).

Contrary to FIG. 17, an input voltage of [-x-y] is assumed to be applied to the piezoelectric elements 51b, 61a, 151a and 161b, and an input voltage of [-x+y] is assumed to be applied to the piezoelectric elements 51a, 61b, 151b and 161a. In this case, the head member 17 moves in the opposite directions of arrows X, and moves in the opposite direction of arrow Y. In this way, the head member 17 can be driven in a skew direction and a Y-axis direction by the input signals of two systems.

[Ninth Embodiment] (FIG. 18 to FIG. 23)

FIG. 18 schematically shows a data storage device 200 comprising a head driving device 10L according to a ninth embodiment. For example, the data storage device 200 includes a case 201, an actuator assembly 202, a first winding device 203, a second winding device 204 and a plurality of guide rollers 205. The data storage device 200 is not limited to the example shown in FIG. 18 and can be structured in various modes depending on the need.

Tape 18 as a recording medium is wound around tape reels 210 and 211. A head member 17 is provided in the actuator assembly 202. The actuator assembly 202 comprises a function of moving the head member 17 in the width direction of the tape 18 (Y-axis direction) and a skew direction. By the head member 17, access (data writing or reading) with respect to the tape 18 is performed.

Figure 21:
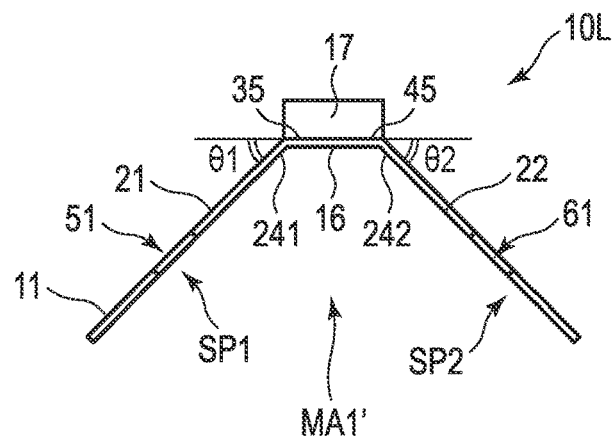
FIG. 21 is a diagram in which the head driving device of the actuator assembly shown in FIG. 19 is viewed in the direction shown by arrow F21 of FIG. 19.

FIG. 19 shows an example of the actuator assembly 202 comprising the head driving device 10L. The two-headed arrow PT1 shown in FIG. 19 is the pitching direction of the head member 17. FIG. 20 is an exploded perspective view of the actuator assembly 202. FIG. 21 is a diagram in which the head driving device 10L is viewed in the direction shown by arrow F21 of FIG. 19.

The actuator assembly 202 includes a slide member 222, coarse motion voice coil motors 223 and 224, a skew driving block 225 and the head driving device 10L. The slide member 222 can move along a pair of guide members 220 and 221. The voice coil motors 223 and 224 move the slide member 222. The skew driving block 225 is attached to the slide member 222. The skew driving block 225 rotates in a skew direction around a skew axis 226.

The pair of voice coil motors 223 and 224 respectively comprise yokes 230 and 231, magnets 232 and 233, and coils 234 and 235. The voice coil motors 223 and 224 move the slide member 222, the head driving device 10L and the skew driving block 225 along the guide members 220 and 221. The voice coil motors 223 and 224 rotate the head driving device 10L and the skew driving block 225 around the skew axis 226.

As shown in FIG. 21, the head driving device 10L comprises a first milliactuator assembly MA1' having a three-dimensional shape, and a second milliactuator assembly MA2' having a three-dimensional shape. The first milliactuator assembly MA1' comprises a first bent portion 241 and a second bent portion 242. The second milliactuator assembly MA2' comprises a third bent portion 243 and a fourth bent portion 244. The first milliactuator assembly MA1' and the second milliactuator assembly MA2' comprise a common structure.

The first milliactuator assembly MA1' is structured in the same manner as the milliactuator assembly MA1 of the sixth embodiment (FIG. 14 and FIG. 15) except for the structure in which the first milliactuator assembly MA1' comprises the bent portions 241 and 242. The second milliactuator assembly MA2' is structured in the same manner as the milliactuator assembly MA2 of the sixth embodiment (FIG. 14 and FIG. 15) except for the structure in which the second milliactuator assembly MA2' comprises the bent portions 243 and 244. Regarding the milliactuator assemblies MA1' and MA2' of the present embodiment, portions in common with the milliactuator assemblies MA1 and MA2 of the sixth embodiment are denoted by common reference numbers, explanations thereof being omitted.

As shown in FIG. 21, the first bent portion 241 is formed in a first head side hinge portion 35. The second bent portion 242 is formed in a second head side hinge portion 45. The first bent portion 241 is bent at angle θ1 less than 90° in the thickness direction of a plate member 11 with respect to a first head supporting portion 16. The second bent portion 242 is bent at angle θ2 on the same side as the first bent portion 241 in the thickness direction of the plate member 11 with respect to the first head supporting portion 16. Angle θ1 of the first bent portion 241 is equal to angle θ2 of the second bent portion 242. Each of angle θ1 and angle θ2 is, for example, 45°.

The third bent portion 243 is formed in a third head side hinge portion 135 (shown in FIG. 15, etc.). As shown in FIG. 19 and FIG. 20, the third bent portion 243 is bent in the same direction as the first bent portion 241. Thus, the third bent portion 243 is bent at the same angle θ1 (for example, 45°) as the first bent portion 241 in the thickness direction of the plate member 11 with respect to a second head supporting portion 116.

The fourth bent portion 244 is formed in a fourth head side hinge portion 145 (shown in FIG. 15, etc.). As shown in FIG. 19 and FIG. 20, the fourth bent portion 244 is bent in the same direction as the third bent portion 243. Thus, the fourth bent portion 244 is bent at the same angle θ2 (for example, 45°) as the third bent portion 243 in the thickness direction of the plate member 11 with respect to the second head supporting portion 116.

As the bent portions 241, 242, 243 and 244 are provided, the head driving device 10L of the present embodiment has a three-dimensional shape like a mountain. This structure allows the head driving device 10L of the present embodiment to have a great rigidity compared to the head driving device 10H of the sixth embodiment (FIG. 14 and FIG. 15) having a planar shape.

Figure 22:
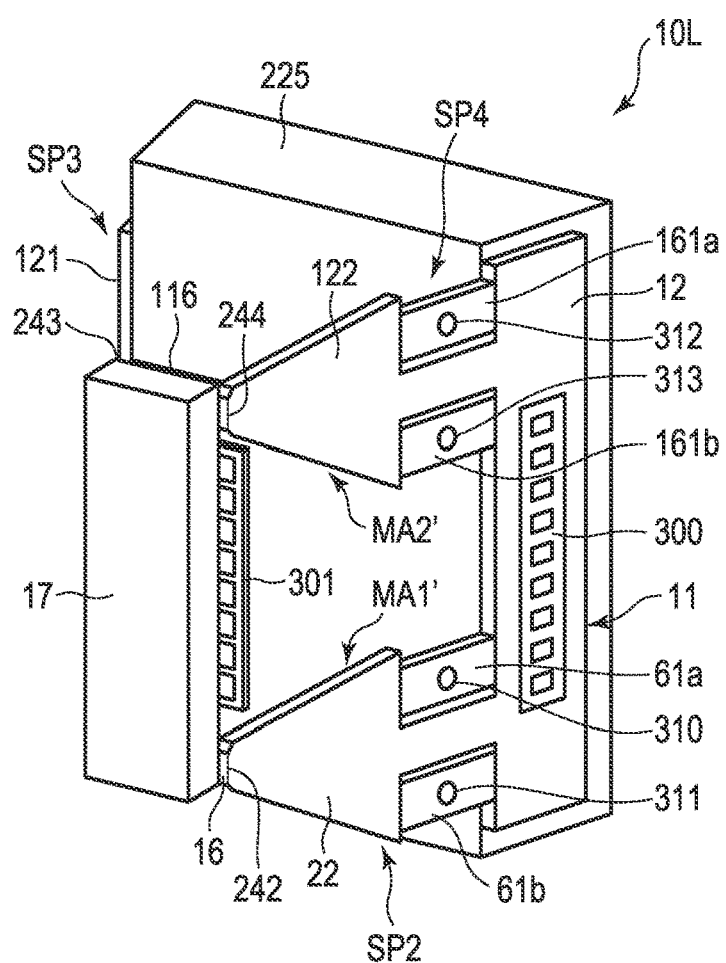
FIG. 22 is a perspective view showing the head driving device and the terminal portion shown in FIG. 19.

As shown in FIG. 22, a terminal portion 300 is provided in the frame portion 12 of the head driving device 10L. Similarly, a terminal portion 301 is provided in the head member 17. Terminals 310, 311, 312 and 313 are provided in piezoelectric elements 61a, 61b, 161a and 161b, respectively. The terminal portion 300 of the frame portion 12 is electrically connected to the terminal portion 301 of the head member 17, and the terminals 310, 311, 312 and 313 of the piezoelectric elements 61a, 61b, 161a and 161b.

FIG. 23 shows the vibration property of the head driving device 10L of the ninth embodiment (FIG. 19 to FIG. 22) and the vibration property of the head driving device 10H of the sixth embodiment (FIG. 14). In FIG. 23, the solid line shows the vibration property of the head driving device 10L comprising the bent portions 241, 242, 243 and 244. The angle of each of the bent portions 241, 242, 243 and 244 is 45°. In FIG. 23, the broken line shows the vibration property of the head driving device 10H which does not comprise a bent portion.

In FIG. 23, R1 shows the pitching mode of the head driving device 10H which does not comprise a bent portion. The pitching mode of the head driving device 10H which does not comprise a bent portion arises at around 1 kHz. In FIG. 23, R2 shows the pitching mode of the head driving device 10L comprising the bent portions. The pitching mode of the head driving device 10L comprising the bent portions arises at around 11 kHz. The head driving device 10L comprising the bent portions has a three-dimensional shape. According to the head driving device 10L having a three-dimensional shape, the frequency of the pitching mode can be largely increased compared to the frequency of the head driving device 10H having a planar shape.

Figure 24:
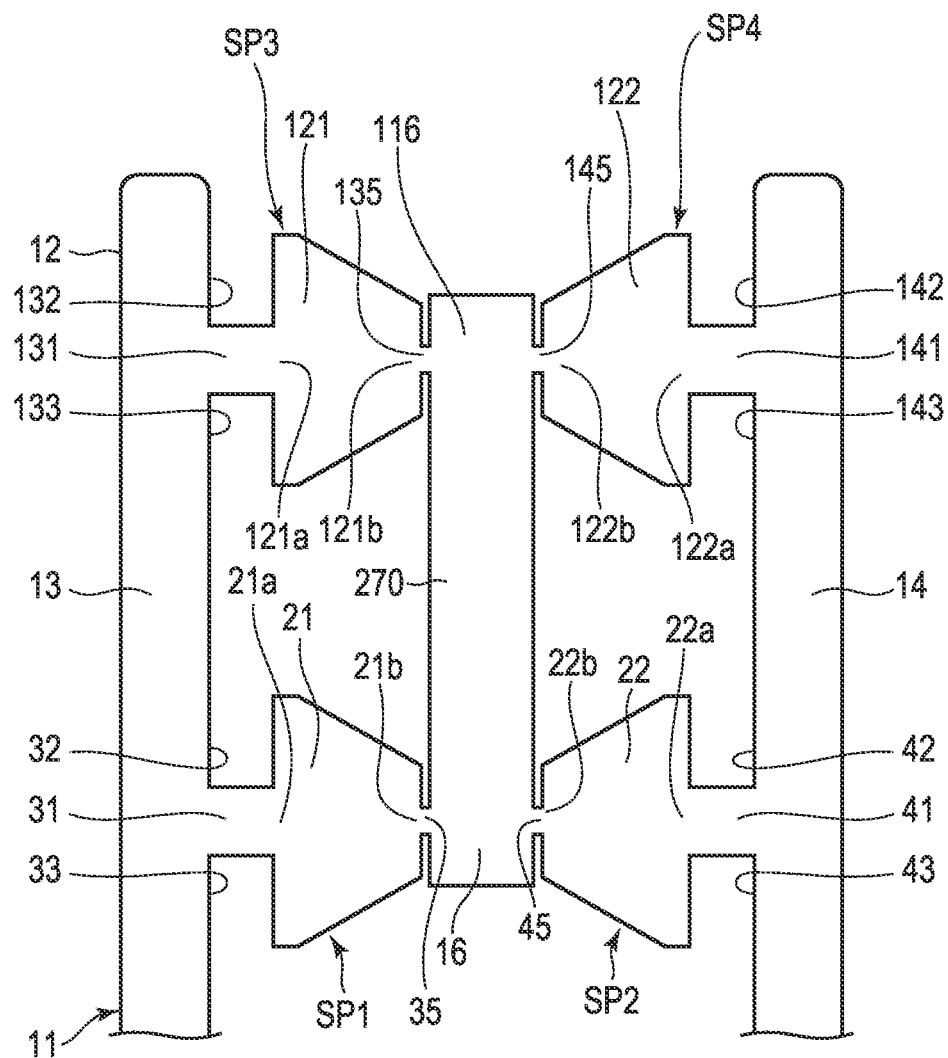
FIG. 24 is a plan view of a plate member comprising a connection portion for connecting two head supporting portions.

In a manner similar to that of the plate member 11 shown in FIG. 24, a connection portion 270 connecting the first head supporting portion 16 to the second head supporting portion 116 may be provided. By providing the connection portion 270, the locational relationship between the first head supporting portion 16 and the second head supporting portion 116 is stabilized. This structure can prevent the positions of the first head supporting portion 16 and the second head supporting portion 116 from changing when the bent portions 241, 242, 243 and 244 are bent. Further, by providing the connection portion 270, the adhesive surface property of the head member 17 can be increased. In addition, the use of the connection portion 270 allows the support of the head member 17 in a stable state.

Figure 25:
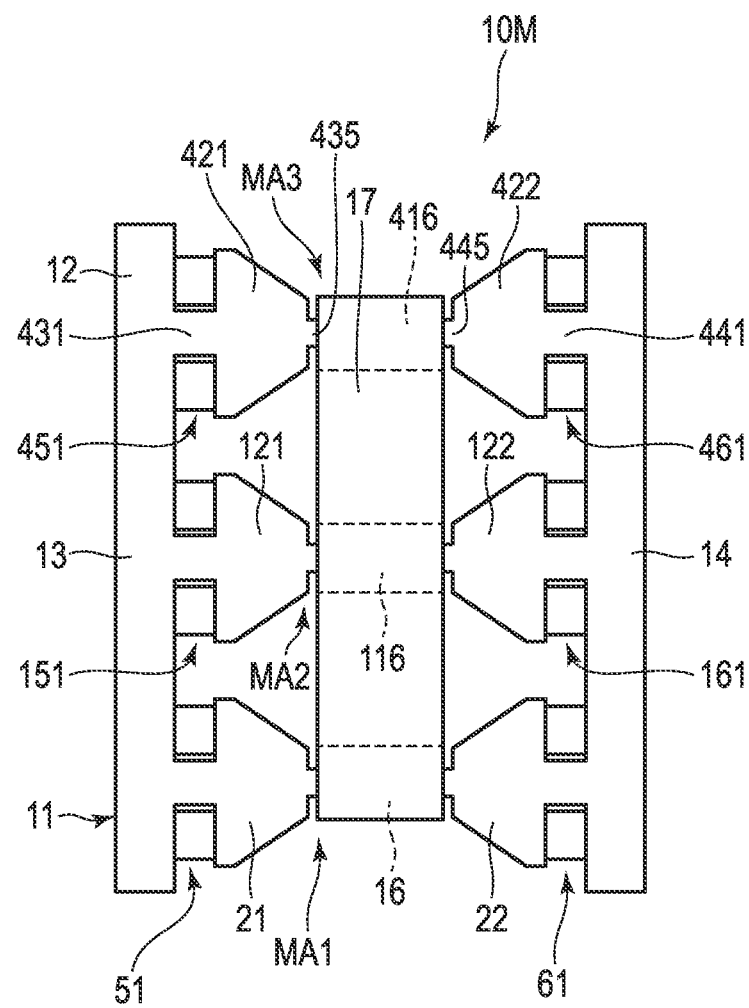
FIG. 25 is a plan view of a head driving device according to a tenth embodiment.

FIG. 25 shows a head driving device 10M according to a tenth embodiment. This head driving device 10M comprises a first milliactuator assembly MA1, a second milliactuator assembly MA2 and a third milliactuator assembly MA3. The third milliactuator assembly MA3 includes a third head supporting portion 416, a fifth beam 421, a sixth beam 422, a fifth piezoelectric unit 451 and a sixth piezoelectric unit 461.

The third head supporting portion 416 is provided between a first base portion 13 and a second base portion 14. The third head supporting portion 416 supports a head member 17. The fifth beam 421 extends from the first base portion 13 to the third head supporting portion 416. The first base portion 13 is connected to the base portion of the fifth beam 421 by a fifth base side hinge portion 431. The distal end of the fifth beam 421 is connected to the third head supporting portion 416 by a fifth head side hinge portion 435.

The sixth beam 422 is provided on the opposite side of the fifth beam 421 across the intervening third head supporting portion 416. The sixth beam 422 extends from the second base portion 14 to the third head supporting portion 416. The second base portion 14 is connected to the base portion of the sixth beam 422 by a sixth base side hinge portion 441.

The distal end of the sixth beam 422 is connected to the third head supporting portion 416 by a sixth head side hinge portion 445.

The fifth piezoelectric unit 451 is provided between the first base portion 13 and the base portion of the fifth beam 421. The fifth piezoelectric unit 451 displaces the distal end of the fifth beam 421 by deforming in a state where voltage is applied. The sixth piezoelectric unit 461 is provided between the second base portion 14 and the base portion of the sixth beam 422. The sixth piezoelectric unit 461 displaces the distal end of the sixth beam 422 by deforming in a state where voltage is applied.

The milliactuator assemblies MA1, MA2 and MA3 comprise a common structure. Each of the milliactuator assemblies MA1, MA2 and MA3 is structured in the same manner as the milliactuator assembly MA1 shown in FIG. 14 and FIG. 15. As the head driving device 10M of the present embodiment comprises three milliactuator assemblies MA1, MA2 and MA3, rigidity can be further increased. In these milliactuator assemblies MA1, MA2 and MA3, bent portions 241, 242, 243 and 244 similar to those of the head driving device 10L of the sixth embodiment may be formed. The milliactuator assemblies comprising the bent portions 241, 242, 243 and 244 have a three-dimensional shape. The number of milliactuator assemblies may be four or more.

Figure 26:
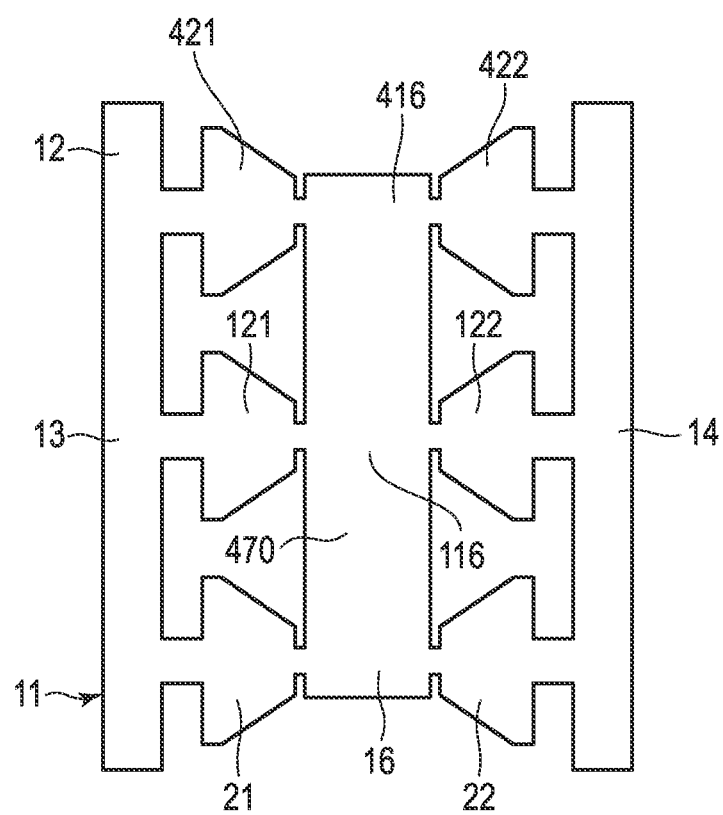
FIG. 26 is a plan view of a plate member comprising a connection portion for connecting three head supporting portions.

The plate member 11 shown in FIG. 26 comprises a connection portion 470. The connection portion 470 connects a first head supporting portion 16, a second head supporting portion 116 and the third head supporting portion 416. By providing the connection portion 470, the locational relationships of the head supporting portions 16, 116 and 416 can be kept constant.

When the present invention is implemented, the specific mode of each of the elements constituting each head driving device can be modified in various ways. In addition, various forms can be applied to the data storage device depending on the need.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A head driving device which drives a head member, the device comprising:
    first base portion and second base portion facing each other across an intervening space;
    a head supporting portion provided between the first base portion and the second base portion and supporting the head member;
    a first beam extending from the first base portion to the head supporting portion;
    a first base side hinge portion connecting a base portion of the first beam to the first base portion;
    a first head side hinge portion connecting a distal end of the first beam to the head supporting portion;
    a second beam provided on an opposite side of the first beam across the intervening head supporting portion, and extending from the second base portion to the head supporting portion;
    a second base side hinge portion connecting a base portion of the second beam to the second base portion;
    a second head side hinge portion connecting a distal end of the second beam to the head supporting portion;
    a first piezoelectric unit provided between the first base portion and the base portion of the first beam, and displacing the distal end of the first beam by deforming in a state where voltage is applied; and
    a second piezoelectric unit provided between the second base portion and the base portion of the second beam, and displacing the distal end of the second beam by deforming in a state where voltage is applied.

2. The head driving device of claim 1, wherein
    a width of the first base side hinge portion is less than a width of the base portion of the first beam,
    a width of the first head side hinge portion is less than a width of the distal end of the first beam,
    a width of the second base side hinge portion is less than a width of the base portion of the second beam, and
    a width of the second head side hinge portion is less than a width of the distal end of the second beam.

3. The head driving device of claim 2, wherein
    a planar shape of the first beam is a shape in which a width is decreased from the base portion of the first beam to the distal end of the first beam, and
    a planar shape of the second beam is a shape in which a width is decreased from the base portion of the second beam to the distal end of the second beam.

4. The head driving device of claim 2, wherein
    first element accommodation portions are provided on both sides of the first base side hinge portion, and a pair of first piezoelectric elements constituting the first piezoelectric unit is provided in the first element accommodation portions, and
    second element accommodation portions are provided on both sides of the second base side hinge portion, and a pair of second piezoelectric elements constituting the second piezoelectric unit is provided in the second element accommodation portions.

5. The head driving device of claim 4, wherein
    one of the first piezoelectric elements is provided with a predetermined polarity,
    the other one of the first piezoelectric elements is provided such that it turns around thereby having an opposite polarity,
    one of the second piezoelectric elements is provided with a predetermined polarity, and
    the other one of the second piezoelectric elements is provided such that it turns around thereby having an opposite polarity.

6. The head driving device of claim 1, further comprising:
    a first suspension consisting of a metal plate member, and including the first beam, the first base side hinge portion and the first head side hinge portion; and
    a second suspension consisting of the plate member, including the second beam, the second base side hinge portion and the second head side hinge portion, and forming a line-symmetric shape with the first suspension with respect to an axis which passes through a center of the head supporting portion.

7. The head driving device of claim 6, further comprising:
    a first bent portion formed in the first suspension, and bending at an angle less than or equal to 90° in a thickness direction of the plate member with respect to the head supporting portion; and
    a second bent portion formed in the second suspension, and bending on a same side as the first bent portion with respect to the head supporting portion.

8. The head driving device of claim 1, further comprising a damper member provided in at least part of the first beam, the second beam and the head supporting portion.

9. A head driving device which drives a head member, the device comprising:
- first base portion and second base portion facing each other across an intervening space;
- a first head supporting portion provided between the first base portion and the second base portion and supporting the head member;
- a first beam extending from the first base portion to the first head supporting portion;
- a first base side hinge portion connecting a base portion of the first beam to the first base portion;
- a first head side hinge portion connecting a distal end of the first beam to the first head supporting portion;
- a second beam provided on an opposite side of the first beam across the intervening first head supporting portion, and extending from the second base portion to the first head supporting portion;
- a second base side hinge portion connecting a base portion of the second beam to the second base portion;
- a second head side hinge portion connecting a distal end of the second beam to the first head supporting portion;
- a first piezoelectric unit provided between the first base portion and the base portion of the first beam, and displacing the distal end of the first beam by deforming in a state where voltage is applied;
- a second piezoelectric unit provided between the second base portion and the base portion of the second beam, and displacing the distal end of the second beam by deforming in a state where voltage is applied;
- a second head supporting portion provided between the first base portion and the second base portion, and supporting the head member;
- a third beam extending from the first base portion to the second head supporting portion;
- a third base side hinge portion connecting a base portion of the third beam to the first base portion;
- a third head side hinge portion connecting a distal end of the third beam to the second head supporting portion;
- a fourth beam provided on an opposite side of the third beam across the intervening second head supporting portion, and extending from the second base portion to the second head supporting portion;
- a fourth base side hinge portion connecting a base portion of the fourth beam to the second base portion;
- a fourth head side hinge portion connecting a distal end of the fourth beam to the second head supporting portion;
- a third piezoelectric unit provided between the first base portion and the base portion of the third beam, and displacing the distal end of the third beam by deforming in a state where voltage is applied; and
- a fourth piezoelectric unit provided between the second base portion and the base portion of the fourth beam, and displacing the distal end of the fourth beam by deforming in a state where voltage is applied.

10. The head driving device of claim 9, further comprising:
- a first suspension consisting of a metal plate member, and including the first beam, the first base side hinge portion and the first head side hinge portion;
- a second suspension consisting of the plate member, including the second beam, the second base side hinge portion and the second head side hinge portion, and forming a line-symmetric shape with the first suspension with respect to an axis which passes through a center of the first head supporting portion;
- a third suspension consisting of the plate member, and including the third beam, the third base side hinge portion and the third head side hinge portion; and
- a fourth suspension consisting of the plate member, including the fourth beam, the fourth base side hinge portion and the fourth head side hinge portion, and forming a line-symmetric shape with the third suspension with respect to the axis which passes through a center of the second head supporting portion.

11. The head driving device of claim 10, further comprising:
- a first bent portion formed in the first suspension, and bending at an angle less than or equal to 90° in a thickness direction of the plate member with respect to the first head supporting portion;
- a second bent portion formed in the second suspension, and bending on a same side as the first bent portion at a same angle as the first bent portion with respect to the first head supporting portion;
- a third bent portion formed in the third suspension, and bending on the same side as the first bent portion at the same angle as the first bent portion with respect to the second head supporting portion; and
- a fourth bent portion formed in the fourth suspension, and bending on a same side as the second bent portion at a same angle as the second bent portion with respect to the second head supporting portion.

12. The head driving device of claim 11, further comprising a connection portion connecting the first head supporting portion to the second head supporting portion.

13. The head driving device of claim 9, further comprising:
- a third head supporting portion provided between the first base portion and the second base portion and supporting the head member;
- a fifth beam extending from the first base portion to the third head supporting portion;
- a fifth base side hinge portion connecting a base portion of the fifth beam and the first base portion;
- a fifth head side hinge portion connecting a distal end of the fifth beam to the third head supporting portion;
- a sixth beam provided on an opposite side of the fifth beam across the intervening third head supporting portion, and extending from the second base portion to the third head supporting portion;
- a sixth base side hinge portion connecting a base portion of the sixth beam to the second base portion;
- a sixth head side hinge portion connecting a distal end of the sixth beam to the third head supporting portion;
- a fifth piezoelectric unit provided between the first base portion and the base portion of the fifth beam, and displacing the distal end of the fifth beam by deforming in a state where voltage is applied; and
- a sixth piezoelectric unit provided between the second base portion and the base portion of the sixth beam, and displacing the distal end of the sixth beam by deforming in a state where voltage is applied.

14. The head driving device of claim 13, further comprising a connection portion connecting the first head supporting portion, the second head supporting portion and the third head supporting portion.

* * * * *